United States Patent
Panzarella et al.

(10) Patent No.: US 9,676,982 B2
(45) Date of Patent: Jun. 13, 2017

(54) PARTICULATE MATERIALS AND METHODS OF FORMING SAME

(71) Applicant: Saint-Gobain Ceramics & Plastics, Inc., Worcester, MA (US)

(72) Inventors: Tracy H. Panzarella, Norwood, MA (US); Doruk O. Yener, Wilmington, MA (US); Michael D. Kavanaugh, North Grafton, MA (US); Alan J. Brandes, Rutland, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 14/728,628

(22) Filed: Jun. 2, 2015

(65) Prior Publication Data

US 2015/0267099 A1 Sep. 24, 2015

Related U.S. Application Data

(63) Continuation of application No. 14/143,656, filed on Dec. 30, 2013, now Pat. No. 9,074,119.
(Continued)

(51) Int. Cl.
*C09K 3/14* (2006.01)
*C04B 35/628* (2006.01)
(Continued)

(52) U.S. Cl.
CPC .............. *C09K 3/1436* (2013.01); *C01F 7/16* (2013.01); *C01G 17/00* (2013.01); *C04B 35/62802* (2013.01); *C04B 35/62813* (2013.01); *C09K 3/1409* (2013.01); *C09K 3/1418* (2013.01); *C01P 2004/03* (2013.01); *C01P 2004/82* (2013.01); *C04B 2235/3217* (2013.01)

(58) Field of Classification Search
CPC ................................... C09K 3/14; C03C 10/00
See application file for complete search history.

(56) References Cited

U.S. PATENT DOCUMENTS 345,604 A    7/1886   Semper
1,910,444 A  5/1933   Nicholson
(Continued)

FOREIGN PATENT DOCUMENTS

CA    743715 A    10/1966
CA    2423788 A1  7/2002
(Continued)

OTHER PUBLICATIONS

"Investigation of Shaped Abrasive Particles vol. 1: Review of U.S. Pat. No. 6,054,093 Apr. 25, 2000" © Apr. 2011, 5 pages.
(Continued)

*Primary Examiner* — Pegah Parvini
(74) *Attorney, Agent, or Firm* — Abel Law Group, LLP; Adam Keser

(57) ABSTRACT

A particulate material having a body including a first phase having at least about 70 wt % alumina for a total weight of the first phase, and a second phase comprising phosphorus, wherein the body includes at least about 0.1 wt % of the second phase for the total weight of the body, and wherein the second phase has an average grain size of not greater than about 1 micron.

20 Claims, 11 Drawing Sheets

Related U.S. Application Data

(60) Provisional application No. 61/747,948, filed on Dec. 31, 2012.

(51) Int. Cl.
*C01F 7/16* (2006.01)
*C01G 17/00* (2006.01)

(56) References Cited

U.S. PATENT DOCUMENTS

| | | |
|---|---|---|
| 2,049,874 A | 8/1936 | Sherk |
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,563,650 A | 8/1951 | Heinemann et al. |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 9/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,791,084 A * | 12/1988 | Sato ............... C10G 11/05 502/64 |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Monroe et al. |
| 4,917,852 A | 4/1990 | Poole et al. |
| 4,918,116 A | 4/1990 | Gardziella et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Willkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |

(56) References Cited

U.S. PATENT DOCUMENTS

| | | |
|---|---|---|
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,496,386 A | 3/1996 | Broberg et al. |
| 5,500,273 A | 3/1996 | Holmes et al. |
| 5,514,474 A | 5/1996 | Morgan et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A | 2/1997 | Zeiringer et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,984,988 A | 11/1999 | Berg et al. |
| 5,989,301 A | 11/1999 | Laconto, Sr. et al. |
| 5,997,597 A | 12/1999 | Hagan |
| 6,013,591 A | 1/2000 | Ying et al. |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,451,076 B1 | 9/2002 | Nevoret et al. |
| 6,475,253 B2 | 11/2002 | Culler et al. |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |

(56) References Cited

U.S. PATENT DOCUMENTS

| | | |
|---|---|---|
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,652,967 B2* | 11/2003 | Yadav .............. B01J 12/02 427/201 |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,755,729 B2 | 6/2004 | Ramanath et al. |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,974,930 B2 | 12/2005 | Jense |
| 7,022,179 B1 | 4/2006 | Dry |
| 7,044,989 B2 | 5/2006 | Welygan et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,628,597 B2 | 1/2014 | Palmgren et al. |
| 8,783,589 B2 | 7/2014 | Hart et al. |
| 8,852,643 B2 | 10/2014 | Gonzales et al. |
| 8,870,985 B2* | 10/2014 | Wang ............ B24D 3/00 51/295 |
| 9,017,439 B2 | 4/2015 | Yener et al. |
| 2001/0027623 A1 | 10/2001 | Rosenflanz |
| 2002/0026752 A1 | 3/2002 | Culler et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0148870 A1 | 8/2004 | Celikkaya et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2006/0246305 A1* | 11/2006 | Cheng ............ C09D 4/00 428/447 |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017736 A1 | 1/2009 | Block et al. |
| 2009/0165394 A1 | 7/2009 | Culler et al. |
| 2009/0165661 A1 | 7/2009 | Koenig et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0056816 A1 | 3/2010 | Wallin et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0292428 A1 | 11/2010 | Meador et al. |
| 2010/0307067 A1 | 12/2010 | Sigalas et al. |

(56) References Cited

U.S. PATENT DOCUMENTS

| | | |
|---|---|---|
| 2010/0319269 A1 | 12/2010 | Erickson |
| 2011/0008604 A1 | 1/2011 | Boylan |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0236725 A1 | 9/2013 | Yener et al. |
| 2013/0255162 A1 | 10/2013 | Welygan et al. |
| 2013/0267150 A1 | 10/2013 | Seider et al. |
| 2013/0283705 A1 | 10/2013 | Fischer et al. |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0290147 A1 | 10/2014 | Seth et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0218430 A1 | 8/2015 | Yener et al. |
| 2015/0232727 A1 | 8/2015 | Erickson |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapre et al. |
| 2016/0214903 A1 | 7/2016 | Humpal et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0340564 A1 | 11/2016 | Louapre et al. |
| 2016/0354898 A1 | 12/2016 | Nienaber et al. |
| 2016/0362589 A1 | 12/2016 | Bauer et al. |

FOREIGN PATENT DOCUMENTS

| | | |
|---|---|---|
| CH | 685051 A5 | 3/1995 |
| CN | 102732883 A | 10/2012 |
| CN | 102123837 B | 7/2014 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B3 | 7/2001 |
| EP | 0833803 | 8/2001 |
| EP | 1356152 A2 | 10/2003 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2390056 A2 | 11/2011 |
| EP | 1800801 B1 | 3/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2720676 A1 | 4/2014 |
| EP | 2012972 B1 | 6/2014 |
| FR | 2354373 A1 | 1/1978 |
| GB | 986847 A | 3/1965 |
| JP | 53064890 A | 6/1978 |
| JP | 60-006356 U | 1/1985 |
| JP | 62002946 B | 1/1987 |
| JP | 63036905 B | 7/1988 |
| JP | 3079277 A | 4/1991 |

(56) References Cited

FOREIGN PATENT DOCUMENTS

| | | |
|---|---|---|
| JP | 03-287687 | 12/1991 |
| JP | 5285833 A | 11/1993 |
| JP | 6114739 A | 4/1994 |
| JP | 7008474 B2 | 2/1995 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 3160084 B2 | 4/2001 |
| JP | 2001162541 A | 6/2001 |
| JP | 03194269 B2 | 7/2001 |
| JP | 2001207160 A | 7/2001 |
| JP | 2002-038131 A | 2/2002 |
| JP | 2003-049158 A | 2/2003 |
| JP | 2004-510873 A | 4/2004 |
| JP | 2004209624 A | 7/2004 |
| JP | 2006513967 A | 4/2006 |
| JP | 2006514910 A | 5/2006 |
| JP | 2006159402 A | 6/2006 |
| JP | 2006-192540 A | 7/2006 |
| JP | 2008194761 A | 8/2008 |
| JP | 5238725 B2 | 7/2013 |
| JP | 5238726 B2 | 7/2013 |
| KR | 20050095888 A | 10/2005 |
| NL | 171464 B | 11/1982 |
| WO | 9402559 A1 | 2/1994 |
| WO | 95/03370 | 2/1995 |
| WO | 95/18192 A1 | 7/1995 |
| WO | 9520469 A1 | 8/1995 |
| WO | 96/27189 A1 | 9/1996 |
| WO | 9714536 A1 | 4/1997 |
| WO | 9906500 A1 | 2/1999 |
| WO | 99/38817 A1 | 8/1999 |
| WO | 9938817 A1 | 8/1999 |
| WO | 9954424 A1 | 10/1999 |
| WO | 01/14494 A1 | 3/2001 |
| WO | 02097150 | 12/2002 |
| WO | 03/087236 A1 | 10/2003 |
| WO | 2005/080624 A1 | 9/2005 |
| WO | 2006/027593 | 3/2006 |
| WO | 2007/041538 A1 | 4/2007 |
| WO | 2009085578 A2 | 7/2009 |
| WO | 2010/077509 A1 | 7/2010 |
| WO | 2010085587 A1 | 7/2010 |
| WO | 2010/151201 | 12/2010 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013/045251 A1 | 4/2013 |
| WO | 2013/049239 A1 | 4/2013 |
| WO | 2013070576 A2 | 5/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/151745 A1 | 10/2013 |
| WO | 2013/177446 A1 | 11/2013 |
| WO | 2013/188038 A1 | 12/2013 |
| WO | 2014/005120 A1 | 1/2014 |
| WO | 2014/161001 A1 | 2/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/057273 A1 | 4/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/112379 A1 | 7/2015 |
| WO | 2015/130487 A1 | 9/2015 |
| WO | 2015/158009 A1 | 10/2015 |
| WO | 2015/164211 A1 | 10/2015 |
| WO | 2015/167910 A1 | 11/2015 |
| WO | 2015/179335 A1 | 11/2015 |
| WO | 20151165122 A1 | 11/2015 |
| WO | 2015/180005 A1 | 12/2015 |
| WO | 2016/028683 A1 | 2/2016 |
| WO | 2016/044158 A1 | 3/2016 |
| WO | 2016/064726 A1 | 4/2016 |
| WO | 2016/089675 A1 | 6/2016 |
| WO | 2016/160357 A1 | 10/2016 |
| WO | 2016/161157 A1 | 10/2016 |
| WO | 2016/161170 A1 | 10/2016 |
| WO | 2016/167967 A1 | 10/2016 |
| WO | 2016/196795 A1 | 12/2016 |
| WO | 2016/205133 A1 | 12/2016 |
| WO | 2016/205267 A1 | 12/2016 |
| WO | 2016/210057 A1 | 12/2016 |
| WO | 2017/007703 A1 | 1/2017 |
| WO | 2017/007714 A1 | 1/2017 |

OTHER PUBLICATIONS

Austin, Benson M., "Thick-Film Screen Printing," Solid State Technology, Jun. 1969, pp. 53-58.
Avril, Nicholas Joseph, "Manufacturing Glass-fiber Reinforcement for Grinding Wheels," Massachusetts Institute of Technology, 1996, 105 pgs.
Bacher, Rudolph J., "High Resolution Thick Film Printing," E.I. du Pont de Nemours & Company, Inc., pp. 576-581, date unknown.
Besse, John R., "Understanding and controlling wheel truing and dressing forces when rotary plunge dressing," Cutting Tool Engineering, Jun. 2012, vol. 64, Issue 6, 5 pages.
Brewer, L. et al., Journal of Materials Research, 1999, vol. 14, No. 10, pp. 3907-3912.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, 1 page.

(56) References Cited

OTHER PUBLICATIONS

Wu, J. et al., Friction and Wear Properties of Kevlar Pulp Reinforced Epoxy.
J. European Ceramic Society 31, Abstract only (2011) 2073-2081.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
Winter Catalogue No. 5, Dressing tools, WINTER diamond tools for dressing grinding wheels, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Vanstrum et al., Precisely Shaped Grain (PSG): 3M's Innovation in Abrasive Grain Technology, date unknown, 1 page.
Graf, "Cubitron II: Precision-Shaped Grain (PSG) Turns the Concept of Gear Grinding Upside Down," gearsolutions.com, May 2014, pp. 36-44.
Dow Machine Tool Accessories, Grinding & Surface Finishing, www.1mta.com, Nov. 2014, 72 pages.
Min, Wu et al.; "Thermal and mechanical properties of sintered $LaPO_4$-$Al_2O_3$ composites;" Materials Research Bulletin; vol. 36; No. 5-6; Mar. 1, 2001; pp. 939-945.
Wang, Ruigang et al.; "Properties and microstructure of machinable $Al_xO_3$/$LaPO_4$ ceramic composites;" Ceramics International; Elsevier, Amsterdam, NL; vol. 29; No. 1; Jan. 1, 2003, pp. 19-25.
Hay, Randall S. et al.; "Monazite Coatings on Fibers: I, Effect of Temperature and Alumina Doping on Coated-Fiber Tensile Strength;" Journal of the American Ceramic Society, Dec. 1, 2001; pp. 2783-2792.
European Search Report for corresponding Application No. 13869730.5 (PCT/US2013/078282), Nov. 24, 2017, 2 pages.

* cited by examiner

PARTICULATE MATERIALS AND METHODS OF FORMING SAME

CROSS-REFERENCE TO RELATED APPLICATION(S)

The present application is a continuation of U.S. Non-Provisional patent application Ser. No. 14/143,656, filed Dec. 30, 2013, entitled "PARTICULATE MATERIALS AND METHODS OF FORMING SAME," naming inventors Tracy H. Panzarella, Doruk O. Yener, Michael D. Kavanaugh, and Alan J. Brandes, which claims priority from U.S. Provisional Patent Application No. 61/747,948, filed Dec. 31, 2012, entitled "PARTICULATE MATERIALS AND METHODS OF FORMING SAME," naming inventors Tracy H. Panzarella, Doruk O. Yener, Michael D. Kavanaugh, and Alan J. Brandes, which application is incorporated by reference herein in its entirety.

BACKGROUND

Field of the Disclosure

The following is directed to particulate materials, such as, particulate materials including a first phase and a second phase, and methods of forming a particulate material.

Description of the Related Art

Abrasive particles and abrasive articles made from abrasive particles are useful for various material removal operations including grinding, finishing, and polishing. Depending upon the type of abrasive material, such abrasive particles can be useful in shaping or grinding a wide variety of materials and surfaces in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Three basic technologies that have been employed to produce abrasive particles having a specified shape are (1) fusion, (2) sintering, and (3) chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660, disclosing a process comprising the steps of flowing molten abrasive material from a furnace onto a cool rotating casting cylinder, rapidly solidifying the material to form a thin semisolid curved sheet, densifying the semisolid material with a pressure roll, and then partially fracturing the strip of semisolid material by reversing its curvature by pulling it away from the cylinder with a rapidly driven cooled conveyor.

In the sintering process, abrasive particles can be formed from refractory powders having a particle size of up to 10 micrometers in diameter. Binders can be added to the powders along with a lubricant and a suitable solvent, e.g., water. The resulting mixtures, mixtures, or slurries can be shaped into platelets or rods of various lengths and diameters. See, for example, U.S. Pat. No. 3,079,242, which discloses a method of making abrasive particles from calcined bauxite material comprising the steps of (1) reducing the material to a fine powder, (2) compacting under affirmative pressure and forming the fine particles of said powder into grain sized agglomerations, and (3) sintering the agglomerations of particles at a temperature below the fusion temperature of the bauxite to induce limited recrystallization of the particles, whereby abrasive grains are produced directly to size.

Chemical ceramic technology involves converting a colloidal dispersion or hydrosol (sometimes called a sol), optionally in a mixture, with solutions of other metal oxide precursors, to a gel or any other physical state that restrains the mobility of the components, drying, and firing to obtain a ceramic material. See, for example, U.S. Pat. Nos. 4,744,802 and 4,848,041.

Still, there remains a need in the industry for improving performance, life, and efficacy of abrasive particles, and the abrasive articles that employ abrasive particles.

SUMMARY

According to one aspect, a method of making a particulate material includes providing a raw material powder, including an additive to the raw material powder, and forming a particulate material having a body including a first phase comprising an oxide and a second phase comprising elements of the additive including phosphorus and a rare earth element, wherein the second phase is substantially uniformly distributed throughout the body.

According to another aspect, a particulate material includes a body including a first phase having at least about 70 wt % alumina for a total weight of the first phase, and a second phase comprising phosphorus, wherein the body comprises at least about 0.1 wt % of the second phase for the total weight of the body, and wherein the second phase has an average grain size of not greater than about 1 micron.

In yet another aspect, a particulate material has a body including a first phase comprising alumina and a second phase comprising phosphorus and a rare earth element, wherein the second phase is non-uniformly dispersed throughout the body, and wherein the first phase has an average grain size of not greater than about 10 microns.

For another aspect, a material includes a body including a first phase comprising alumina and a second phase comprising phosphorus and a rare earth element, wherein the second phase is substantially uniformly dispersed throughout the body.

According to yet another aspect, an abrasive particulate material has a body including a first phase comprising alpha alumina and a second phase comprising monazite ($LaPO_4$), wherein the monazite is disposed between grains of alumina, and wherein the second phase is substantially uniformly dispersed throughout the body.

For yet another aspect, a batch of particulate material has at least one predetermined classification characteristic, wherein each of the particulate material of the batch has a body including a first phase comprising alpha alumina and a second phase comprising phosphorus.

In one aspect, a shaped abrasive particle has a body including a first phase and a second phase comprising monazite ($LaPO_4$).

In one particular aspect, an abrasive article includes a bond material and an abrasive particulate material having a body including a first phase comprising alumina and a second phase comprising phosphorous, wherein the second phase is substantially uniformly distributed throughout the body.

Still, in yet another aspect, a particulate material has a body including a first phase and a second phase comprising monazite ($LaPO_4$), wherein the second phase is disposed between grains of the first phase.

For another aspect, a particulate material has a body including a first phase comprising alumina and a second phase comprising phosphorus, wherein the second phase is disposed between domains of the first phase.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is directed to methods of forming a particulate material having certain compositions, including a particulate material in the form of abrasive particles, shaped abrasive particles, and the like. The particulate material may be used in various articles, including for example, abrasive articles, including for example, fixed abrasives, such as bonded abrasive articles, coated abrasive articles, and the like.

Figure 1:
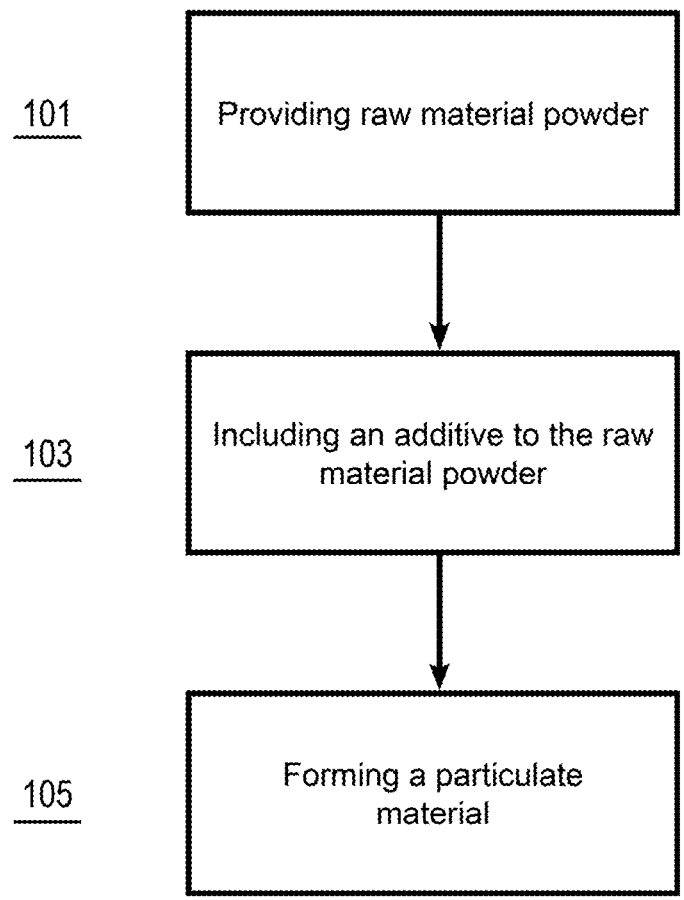
FIG. 1 includes a flowchart illustrating a process of forming a particulate material in accordance with an embodiment.

FIG. 1 includes a flowchart illustrating a process of forming a particulate material in accordance with an embodiment. As illustrated, the process can be initiated at step 101, by providing a raw material powder. In at least one embodiment, the raw material powder can be a material selected from the group of oxides, carbides, nitrides, borides, oxycarbides, oxynitrides, oxyborides, and combination thereof. In certain instances, the raw material powder may include an oxide. Furthermore, the raw material powder may include alumina, and may consist essentially of alumina. In one embodiment, the raw material powder may include a hydrated alumina. In another embodiment, the raw material powder may include alpha alumina.

As noted herein, the raw material powder can included a seeded material, such as material processed through a seeded processing pathway. That is, for example, the raw material may be include a seed material, which may be a compound, complex, or element configured to control the growth of particular crystalline phases within the raw material powder. The seeded raw material powder may include a minority content of seed material, which may facilitate the formation of particular crystalline phases during further processing of the raw material powder. One non-limiting seeded processing pathway is described herein. In other instances, the raw material powder may include an unseeded material, and can be essentially free of seed material.

Providing a raw material powder can include synthesis of a particulate material by obtaining an aluminous raw material. While certain aluminous raw materials can be sourced commercially, in other instances, the aluminous raw material may be manufactured. In accordance with an embodiment, the process of forming can include processes such as, dispersing, mixing, gelling, seeding, calcining, shaping, printing, molding, extruding, pressing, drying, crushing, sieving, sorting, and a combination thereof.

As noted herein, the raw material powder may be obtained by manufacturing the powder, including for example, manufacturing an aluminous raw material according to a seeded pathway. In one embodiment, the aluminous raw material can include a boehmite precursor and boehmite seeds in a suspension (alternatively sol or slurry), that can be heat-treated (such as by hydrothermal treatment) to convert the boehmite precursor into boehmite particulate material formed of particles or crystallites. The term "boehmite" is generally used herein to denote alumina hydrates including mineral boehmite, typically being Al2O3.H2O and having a water content on the order of 15%, as well as pseudoboehmite, having a water content higher than 15%, such as 20-38% by weight. It is noted that boehmite (including pseudoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

After forming suitable boehmite particulate material, a heat treatment process can be carried out to effect polymorphic transformation, which removes water and forms an alumina material. According to one aspect, the boehmite particulate material can have a relatively elongated morphology, described generally herein in terms of primary (and also secondary and tertiary) aspect ratio and described in more detail below, and the morphology of the boehmite is largely preserved in the feedstock particulate material.

Primary aspect ratio is defined as the ratio of the longest dimension to the next longest dimension perpendicular to the longest dimension and is generally not less than 2:1, and preferably not less than 3:1, 4:1, or 6:1. With particular reference to needle-shaped particles, the particles may be further characterized with reference to a secondary aspect ratio defined as the ratio of the second longest dimension to the third longest dimension. The secondary aspect ratio is generally not greater than 3:1, typically not greater than 2:1, or even 1.5:1, and oftentimes about 1:1. The secondary aspect ratio generally describes the cross-sectional geometry of the particles in a plane perpendicular to the longest dimension. It is noted that since the term aspect ratio is used herein to denote the ratio of the longest dimension to the next longest dimension, it may be referred as the primary aspect ratio.

Alternatively, the boehmite particulate material can have a platey or platelet-shaped contour, generally have an elongated structure having the primary aspect ratios described above in connection with the needle-shaped particles. However, platelet-shaped particles generally have opposite major surfaces, the opposite major surfaces being generally planar and generally parallel to each other. In addition, the platelet-shaped particles may be characterized as having a secondary aspect ratio greater than that of needle-shaped particles, generally not less than about 3:1, such as not less than about 6:1, or even not less than 10:1.

The morphology of the boehmite particulate material formed through a seeding process can have a relatively fine particle or crystallite size. Generally, the average boehmite material particle size is not greater than about 1000 nanometers, and fall within a range of about 100 to 1000 nanometers. Other embodiments have even finer average particle sizes, such as not greater than about 800 nanometers, 750 nanometers, 600 nanometers, 500 nanometers, 400 nanometers, and even particles having an average particle size smaller than 300 nanometers, representing a fine particulate material. As used herein, the "average particle size" in connection with high aspect ratio boehmite particulate material is used to denote the average longest or length dimension of the particles.

In addition to aspect ratio and average particle size of the boehmite particulate material, morphology of the boehmite particulate material may be further characterized in terms of specific surface area. Here, the commonly available BET technique was utilized to measure specific surface area of the boehmite particulate material. According to embodiments herein, the boehmite particulate material may have a relatively high specific surface area, generally not less than about 10 m2/g, such as not less than about 50 $m^2/g$, 70 $m^2/g$, or not less than about 90 $m^2/g$. Since specific surface area is a function of particle morphology as well as particle size, generally the specific surface area of embodiments was less than about 400 $m^2/g$, such as less than about 350 or 300 $m^2/g$. Specific ranges for surface area are about 75 $m^2/g$ to 200 $m^2/g$.

Turning to the details of the processes by which the seeded boehmite particulate material may be manufactured, generally ellipsoid, needle, or platelet-shaped boehmite are formed from a boehmite precursor, typically an aluminous material including bauxitic minerals, by hydrothermal treatment as generally described in the commonly owned patent described above, U.S. Pat. No. 4,797,139. More specifically, the boehmite particulate material may be formed by combining the boehmite precursor and boehmite seeds in suspension, exposing the suspension (alternatively sol or slurry) to heat treatment to cause conversion of the raw material into boehmite particulate material, further influenced by the boehmite seeds provided in suspension. Heating is generally carried out in an autogenous environment, that is, in an autoclave, such that an elevated pressure is generated during processing. The pH of the suspension is generally selected from a value of less than 7 or greater than 8, and the boehmite seed material can have a particle size finer than about 0.5 microns. Generally, the seed particles are present in an amount greater than about 1% by weight of the boehmite precursor (calculated as $Al_2O_3$), and heating is carried out at a temperature greater than about 120° C., such as greater than about 125° C., or even greater than about 130° C., and at a pressure that is autogenously generated, typically around 30 psi.

Following heat treatment, such as by hydrothermal treatment, and boehmite conversion, the liquid content is generally removed, such as through an ultrafiltration process or by heat treatment to evaporate the remaining liquid. Thereafter, the resulting mass is generally crushed, such as to 100 mesh. It is noted that the particulate size described herein generally describes the individual particles formed through processing, rather than the aggregates which may remain in certain embodiments (e.g., for those products that call for an aggregated material).

Certain processing variables may be modified during the formation of the boehmite particulate material, to affect the desired morphology. These variables include the weight ratio, that is, the ratio of boehmite precursor to boehmite seed, the particular type or species of acid or base used during processing (as well as the relative pH level), and the temperature (which is directly proportional to pressure in an autogenous hydrothermal environment) of the system.

Suitable acids and bases include mineral acids such as nitric acid, organic acids such as formic acid, halogen acids such as hydrochloric acid, and acidic salts such as aluminum nitrate and magnesium sulfate. Effective bases include, for example, amines including ammonia, alkali hydroxides such as potassium hydroxide, alkaline hydroxides such as calcium hydroxide, and basic salts.

After forming the boehmite particulate material, which can be the raw material powder used in later processes according to embodiments herein, the process can further include heat-treatment of the boehmite particulate material to form an aluminous material. In accordance with a particular embodiment, the heat-treatment can include calcination of the boehmite particulate material at a temperature sufficient to cause transformation into a particular phase of alumina (e.g., gamma, delta, theta, alpha) or combination of phases of alumina providing a suitable aluminous material. For purposes of clarification, an aluminous material is one that comprises a majority content (wt %) of alumina (Al2O3) and preferably, at least about 80 wt %, at least 90 wt %, at least 95 wt % or even consisting essentially of alumina. Still, the boehmite particulate material may be used for other processes before heat-treatment, including for example the provision of an additive, which is described in more detail herein.

Referring again to FIG. 1, after step 101 and providing a raw material, the process can continue at step 103 by including an additive to the raw material powder. In accordance with an embodiment, the process of including an additive can include an impregnation process, which may include providing the additive into pores of the raw material powder. The porosity of the raw material powder may be obtained through natural or artificial processes. For example, the raw material powder may first be processed through other techniques, such as calcining to facilitate the formation of a porous raw material powder, and thereafter, the additive may be added to the raw material powder to facilitate impregnation. Still, as will be described herein, one or more processes may be utilized before or after calcination to facilitate inclusion of an additive.

In certain instances, the process of impregnating can include saturation of the porosity of the raw material powder with the additive. Saturation can include filling at least a portion of the pore volume of the raw material powder with the additive. Still, a saturation process may include filling a majority of the porosity with the additive, and more particularly, may include filling substantially all of the total pore volume of the raw material powder with the additive. The saturation process, which may further include an oversaturation process, can utilize processes including, but not limited to, soaking, mixing, stirring, increased pressure above atmospheric conditions, decreased pressure below atmospheric conditions, particular atmospheric conditions (e.g., inert atmosphere, reducing atmosphere, oxidizing atmosphere), heating, cooling, and a combination thereof. In at least one particular embodiment, the process of including can include soaking the raw material powder in a solution containing the additive.

In certain instances, the additive can include more than one component. For example, the additive may include a first component and a second component distinct from the first component. In accordance with an embodiment, the first component may include a rare earth element, and more particularly, a compound including at least one rare earth element. According to certain embodiments, the first component may include a salt, and may be present as a solution including the rare earth element. For example, the first component may include a nitrate salt solution. In one particular embodiment, the rare earth element may include lanthanum (La), and more particularly, may include lanthanum nitrate.

As noted above, the additive can include a second component distinct from the first component. For example, the second component may include an element such as phosphorous. In addition, the second component may be present as a compound including phosphorous. For certain embodiments, the second component can include a solution comprising phosphorous. Some suitable solutions can include an acid, which can have a pH less than about 7, a base, which can have a pH of greater than about 7, or alternatively a neutral solution. In one particular instance, the second component can include hydrogen, and more particularly, may be present as phosphoric acid ($H_3PO_4$).

The process of including the additive can include particular combinations of the first component and the second component into the raw material powder. For example, in one embodiment, the process of including the additive can include providing the first component at a first time and the second component at a second time. The first time and second time may be the same as each other, such that the first component and second component can be added to the raw material powder simultaneously. Still, in another embodiment, the first component and second component can be added to the raw material powder at different times. For example, the first component may be added before the second component. Alternatively, the first component may be added after the second component.

The process of including an additive can include performing at least one process between the addition of the first component and the addition of the second component to the raw material powder. For example, some exemplary processes that may be conducted between the addition of the first component and the second component can include mixing, drying, heating, calcining and a combination thereof. In one particular embodiment, the process of including the additive may include providing the first component to the raw material powder, heating the raw material powder after the addition of the first component to the raw material powder, and providing the second component to the raw material powder and first component after heating the raw material and first component. It will be appreciated that such a heating process may include a calcining process.

The process of calcination can include heating the raw material powder to a temperature suitable to remove particular volatile components and facilitate the formation of a porous raw material. In one particular instance, the process of calcining can be conducted at a temperature of at least about 300° C. In other instances, the calcining temperature may be greater, such as at least about 600° C., at least about 700° C., or even at least about 750° C. Still, the process of calcining may be conducted at a temperature not greater than about 1200° C., such as not greater than about 1000° C. or even not greater than about 900° C. It will be appreciated that the process of calcining can be conducted at a temperature within a range between any of the minimum and maximum values noted above.

According to alternative embodiment, the process of including an additive can include a process of doping. Doping can include a process wherein the additive is combined with the raw material powder prior to conducting certain processes, particularly calcination of the raw material powder. The doping process may also utilize an additive including a first component and a second component, according to embodiments herein. In particular, the first component and second component may both be added to the raw material powder prior to a calcination process.

Referring again to FIG. 1, after completing the process of including an additive to the raw material powder at step 103, the process can continue at step 105 by forming a particulate material. The particulate material may include a body having a first phase comprising an oxide and second phase comprising at least one element of the additive, including for example, phosphorous, a rare earth element, and a combination thereof.

The process of forming can include combining the first component and second component of the additive to form a precursor of the second phase present within the particulate material. In at least one embodiment, the process of forming can include a reaction of the additive, and more particularly, may include a chemical reaction between at least an element of the first portion of the additive and at least one element of the second portion of the additive to form a chemical product in the form of the precursor of the second phase. For example, in one instance, the precursor of the second phase can include a hydrated compound, more particularly, a compound including phosphorous and the rare earth element, and even more particularly, the precursor of the second phase may include rhabdophane $(La)PO_4 \cdot (H_2O)$, which can include a hydrated form of a compound including at least one rare earth element and phosphate.

In accordance with an embodiment, the process of forming can further include converting the precursor of the second phase to a second phase. In one embodiment, the process of converting the precursor of the second phase to a second phase can include the application or alteration of at least one of temperature, pressure, atmosphere, and a combination thereof. Converting the precursor of the second phase to a second phase can include volatilization of certain species, including for example, water. Moreover, the process of converting can include crystallization or a change in crystalline structure of the precursor of the second phase. In still another embodiment, the process of converting can include densification.

According to a particular embodiment, the process of converting the precursor of the second phase to the second phase can include firing the raw material and precursor of the second phase. The firing process may include a sintering process, including densification of the material and formation of high temperature phases of the first phase, including for example, alpha alumina. Firing may be conducted at a temperature of at least about 500° C., such as at least about 700° C., or even at least about 800° C. Still, firing may be conducted at a temperature that is not greater than about 1200° C., such as not greater than 1100° C., or even not greater than about 1000° C. It will be appreciated that firing may be conducted at a temperature within a range between any of the above minimum and maximum temperatures.

Furthermore, it will be appreciated that sintering may be conducted for a particular time and under a particular atmosphere. For example, sintering may be conducted for at least about 1 minute at ambient conditions, or even at least about 4 minutes, at least about one hour, such as at least about two hours, or even at least about three hours. Furthermore, the atmosphere utilized during sintering may include an oxidizing atmosphere, a reducing atmosphere, or an inert atmosphere.

In accordance with an embodiment, after conducting the forming process, the particulate material can have a density of at least about 95% theoretical density. In other instances, the particulate material may have a greater density, such as at least about 96% or even at least about 97% theoretical density.

After conducting the forming process the particulate material may have a specific surface area of not greater than about 100 m$^2$/g. In still other embodiments, the specific surface area of the particulate material may be not greater than about 90 m$^2$/g, such as not greater than 80 m$^2$/g, or even not greater than about 10 m$^2$/g, or even not greater than about 1 m$^2$/g. Still, the specific surface area of the particulate material may be at least about 0.01 m$^2$/g, or even at least about 0.05 m$^2$/g. It will be appreciated that the specific surface area of the particulate material may be be within a range between any of the above minimum and maximum values.

In yet another embodiment, the particulate material can have a body having an average particle size, which may be selected from a group of predetermined sieve sizes. For example, the body can have an average particle size of not greater than about 5 mm, such as not greater than about 3 mm, not greater than about 2 mm, not gather than about 1 mm, or even not greater than about 0.8 mm. Still, in another embodiment, the body may have an average particle size of at least about 0.1 μm. It will be appreciated that the body may have an average particle size within a range between any of the minimum and maximum values noted above.

Particles for use in the abrasives industry are generally graded to a given particle size distribution before use. Such distributions typically have a range of particle sizes, from coarse particles to fine particles. In the abrasive art this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards.

ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS 1500, JIS2500, JIS4000, JIS6000, JIS8000, and JIS10,000. Alternatively, the shaped abrasive particles 20 can graded to a nominal screened grade using U.S.A. Standard Test Sieves conforming to ASTM E-11 "Standard Specification for Wire Cloth and Sieves for Testing Purposes." ASTM E-11 prescribes the requirements for the design and construction of testing sieves using a medium of woven wire cloth mounted in a frame for the classification of materials according to a designated particle size. A typical designation may be represented as −18+20 meaning that the particles pass through a test sieve meeting ASTM E-11 specifications for the number 18 sieve and are retained on a test sieve meeting ASTM E-11 specifications for the number 20 sieve. In various embodiments, the particulate material can have a nominal screened grade comprising: −18+20, −20/+25, −25+30, −30+35, −35+40, −40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size could be used such as −90+100. The body of the particulate material may be in the form of a shaped abrasive particle, as described in more detail herein.

In accordance with an embodiment, the first phase may include alumina, such as alpha alumina, and more particularly, may consist essentially of alpha alumina. In certain instances, the body may be formed such that it is not greater than about 1 wt % of low-temperature alumina phases. As used herein, low temperature alumina phases can include transition phase aluminas, bauxites or hydrated alumina, including for example gibbsite, boehmite, diaspore, and mixtures containing such compounds and minerals. Certain low temperature alumina materials may also include some content of iron oxide. Moreover, low temperature alumina phases may include other minerals, such as goethite, hematite, kaolinite, and anastase. In particular instances, the particulate material can consist essentially of alpha alumina as the first phase and may be essentially free of low temperature alumina phases.

Furthermore, the particulate material may be formed such that the body includes not greater than about 1 wt % of impurity elements. Some exemplary impurity elements can include transition metal elements, alkaline earth elements, alkaline elements, and a combination thereof. In one particular instance, the body can include a limited amount of water, such as a content within the body of not greater than about 1 wt % water for the total weight of the body. Moreover, the body can be essentially free of water.

In one aspect, the particulate material may have a body including a first phase having at least about 70 wt % alumina for a total weight of the first phase. For other embodiments, the body can include at least about 71 wt % alumina for the total weight of the first phase, such as least about 75 wt %, at least about 77 wt %, at least about 80 wt %, at least about 83 wt %, at least about 85 wt %, at least about 88 wt %, at least about 90 wt %, at least about 93 wt %, at least about 95 wt %, or even consist essentially of alumina.

Furthermore, the particulate material can have a body including at least about 70 wt % of the first phase for the total weight of the body. In other instances, the total content of the first phase may be greater, such as at least about 75 wt %, at least about 77 wt %, at least about 80 wt %, at least about 83 wt %, at least about 85 wt %, at least about 88 wt %, at least about 90 wt %, at least about 93 wt % or even at least about 95 wt % for the total weight of the body. Still, the body may include not greater than about 99.5 wt %, not greater than about 99 wt %, or even not greater than about 98 wt % of the first phase for the total weight of the body. It will be appreciated that the total content of the first phase within the body can be within a range between any of the minimum and maximum percentages noted above.

In yet another embodiment, the particulate material can include a first phase having grains defining crystallites having an average grain size of not greater than about 500 µm. Still, in other instances, the average grain size of the first phase may be not greater than about 250 µm, such as not greater than about 100 µm, not greater than about 50 µm, or even not greater than about 1 µm. Still, in at least one embodiment, the first phase may have an average grain size of at least about 1 nm. It will be appreciated that the average grain size of the first phase can be within a range between any of the minimum and maximum values noted above.

As noted herein, the body can further include a second phase. For certain particulate materials according to embodiments herein, the body can consist essentially of the first phase and the second phase. In one instance, the body can include at least 0.1 wt % of the second phase for the total weight of the body. For other embodiments, the content of the second phase within the body can be greater, such as at least about 0.2 wt %, at least about 0.3 wt %, at least about 0.5 wt %, at least about 0.6 wt %, at least about 0.7 wt %, at least about 0.9 wt %, at least about 1.0 wt %, or even at least about 1.1 wt %. Still, the content of the second phase within the body may be limited, such that it may be not greater than about 30 wt %, such as not greater than about 20 wt %, not greater than about 15 wt %, not greater than about 13 wt %, not greater than about 12 wt %, not greater than about 10 wt %, not greater than about 9 wt %, not greater than about 8 wt %, not greater than about 7 wt %, not greater than about 6 wt %, not greater than about 5 wt %, not greater than about 4 wt %, not greater than about 3 wt %, or even not greater than about 2 wt %. It will be appreciated that the content of the second phase within the body can be within a range between any of the minimum and maximum percentages noted above.

The second phase can be distinct from the first phase by at least one of average grain size, composition, content, crystal structure, and a combination thereof. In certain instances, the second phase can include a rare earth element, and more particularly, a lanthanoid. Some suitable examples of rare earth elements can include materials such as La, Ce, Pr, Nd, Pm, Sm, and a combination thereof. For certain embodiments, the rare earth element can include lanthanum, and more particularly, may consist essentially of lanthanum. The second phase may consist essentially of a single rare earth element. The second phase may be essentially free of certain elements, such as Ce, Nd, Sm, and a combination thereof.

In accordance with an embodiment, the second phase can include an oxide. Furthermore, the second phase may include phosphate. In particular instances, the second phase may include a majority content of phosphate and at least one rare earth element. For example, the second phase can consist essentially of phosphate and at least one rare earth element, and more particularly may consist essentially of monazite ($LaPO_4$). Furthermore, the second phase may consist essentially of a crystalline material. Moreover, the second phase may include a crystalline material having a monoclinic crystalline structure. For example, the second phase can consist essentially of a crystalline phase, and further, can consist essentially of a monoclinic crystalline structure.

In accordance with one embodiment, the body can include a ratio (W1/W2), wherein W1 represents the weight percent of the first phase of the body and W2 represents the weight percent of the second phase within the body. In at least one aspect, the ratio (W1/W2), can be at least about 1, such as at least about 1.1, at least about 1.5, at least about 2, at least about 3, at least about 5, at least about 8, at least about 10, at least about 15, at least about 20, at least about 50, or even at least about 70. Still, in another embodiment the ratio (W1/W2) can be not greater than about 100, or even not greater than about 95. It will be appreciated that the body can have a ratio (W1/W2) within a range between any of the minimum and maximum values provided above.

The particulate material can have a body that includes a particular ratio of size of grains of the first phase and second phase. For example, the body can include a first phase having a first average grain size and a second phase having a second average grain size. In certain instances, the second average grain size of the second phase can be less than the first average grain size of the grains of the first phase. Moreover, in at least one aspect, the body can have a ratio (G1/G2) wherein G1 represents the average grain size of the first phase and G2 represents the average grain size of the second phase. In accordance with a particular embodiment, the ratio (G1/G2) can be at least about 1.1, such as at least about 1.5, at least about 2, at least about 3, at least about 5, at least about 8, at least about 10, at least about 15, a least about 20, or even at least about 50. Still, in at least one embodiment, the ratio (G1/G2) may be not greater than about 500, such as not greater than about 200, or even not greater than about 100. It will be appreciated that the body can include a ratio (G1/G2) within a range between any of the above minimum and maximum values.

In one embodiment, the body can include a second phase having an average grain size of not greater than 500 µm. In other instances, the average grain size of the second phase may be less, such as not greater than about 250 µm, not greater than about 100 µm, not greater than about 50 µm, not greater than about 1 µm, not greater than about 0.8 µm, not greater than about 0.5 µm, or even not greater than about 0.2 µm. Still, the average grain size of the second phase may be at least about 1 nm, such as at least about 0.01 µm or even at least about 0.1 µm. It will be appreciated that the second phase can have an average grain size within a range between any of the minimum and maximum values noted above.

The second phase can be disposed within domains or between domains of any of the other phases present within the body. A domain can include a single crystal or a group of crystals having the same or substantially the same alignment when viewed in two dimensions. In one embodiment, the second phase may be disposed at the grain boundaries of any of the other phases, and more particularly, a majority of the second phase may be disposed as an intergranular phase (i.e., between grains at the grain boundaries) between any of the phases described in embodiments herein. For example, at least 60% of the total content of the second phase can be disposed at the grain boundaries of the first phase. In other embodiments, the amount of second phase disposed at the grain boundaries can be greater, such as at least about 70% of the second phase, at least about 80% of the second phase, at least about 90% of the second phase, or even in some instances essentially all of the second phase can be disposed at the grain boundary of the first phase.

In yet another embodiment, the second phase may be disposed within the grains of any of the other phases present within the body, and more particularly, a majority of the second phase can be disposed as an intragranular phase (i.e., within the grains) within any of the grains of any of the phases described in embodiments herein. For example, a majority of the second phase can be disposed within the grains or domains of the first phase.

In yet another embodiment, the second phase may have a particular morphology. For example, in certain instances, the second phase can have a certain shape as viewed in two-dimensions (e.g., using SEM), including for example, but not limited to, equiaxed, elongated, elliptical, needle-like, irregular, or the like. In one particular embodiment, the second phase can have an elongated morphology, including an aspect ratio of length:width of at least about 1.5:1, wherein length is the longest dimension of the second phase as viewed in two-dimensions and the width is a dimension extending perpendicular to the length and defining a dimension shorter than the length. For other embodiments, the aspect ratio of length:width of the second phase can be at least about 1.8:1, at least about 2:1, at least about 2.5:1, at least about 3:1, or even at least about 5:1. It will be appreciated, that such morphology can apply to any of the phases present within the body of the particulate material in the embodiments herein.

Figure 2A:
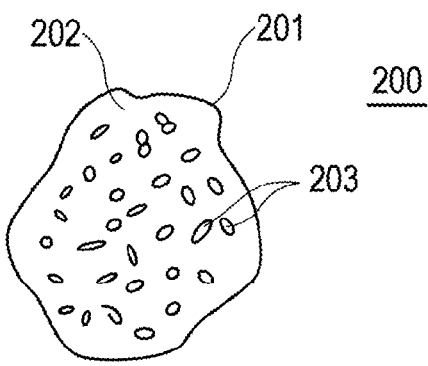
FIG. 2A includes an illustration of a body of a particulate material having a second phase substantially uniformly dispersed within the body according to an embodiment.

In accordance with an embodiment, the body can be formed to have a particular distribution of the second phase within the volume of the body. For example, second phase may be an integral phase within the body. Moreover, the second phase may be substantially uniformly dispersed through the entire volume of the body. FIG. 2A includes an illustration of particulate material including a second phase substantially uniformly dispersed within the body. As illustrated, the particulate material 200 includes a particle having a body 201 that can be formed of a first phase 202 and a second phase 203. The body 201 can be made primarily of the first phase 202, and the second phase 203 can be present in a minority content compared to the first phase 202. As further illustrated, the second phase 203 can be substantially, uniformly dispersed throughout the volume of the body 201, such that if a statistically relevant and random sampling of different portions of the body 201 was obtained, the content of the second phase 203 between each of the different samplings would be substantially the same. In certain embodiments, the variation of the second phase, which may be based upon a standard deviation, may be not greater than about 20% of the average value of the second phase for the body, as calculated by the equation (AVG/STDEV)×100%, wherein AVG represents the average content of the second phase for each of the different portions and STDEV represents the standard deviation of the content of the second phase for the sampling.

Alternatively, the second phase may be non-uniformly dispersed within the body. For example, in one embodiment, the body can have a different content of the second phase at a peripheral region of the body as compared to a content of the second phase at a central region of the body. In certain instances, the body can have a greater content of the second phase at the peripheral region of the body as compared to the content of the second phase at a central region. In another embodiment, the body may have a greater content of the second phase at an exterior surface as compared to a central region of the body. Still, in one alternative embodiment, the content of the second phase may be greater at a central region as compared to the content of the second phase at a peripheral region.

Figure 2B:
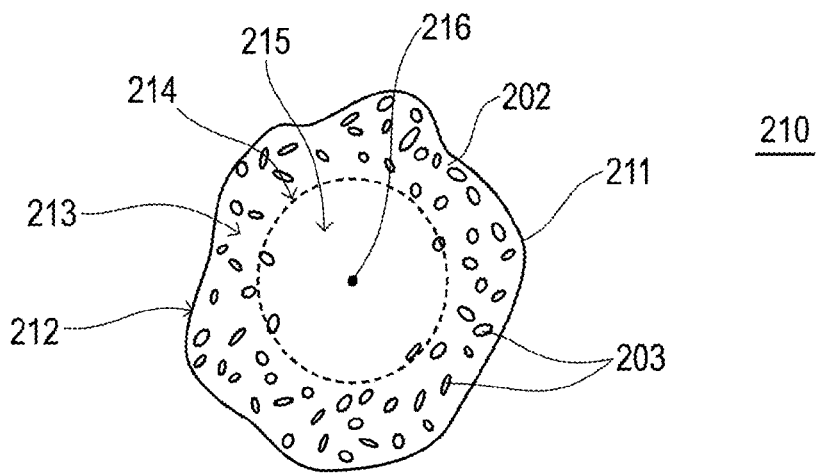
FIG. 2B includes an illustration of a particulate material having a second phase non-uniformly dispersed within the body according to an embodiment.

FIG. 2B includes an illustration of particulate material including a second phase non-uniformly dispersed within the body. As illustrated, the particulate material 210 can include a particle having a body 211 that can be formed of a first phase 202 and a second phase 203. The second phase 203 can be non-uniformly dispersed throughout the volume of the body 211. In particular, the body 211 can include a greater content of the second phase 203 within a peripheral region 213 as compared to the content of the second phase 203 within the central region 215. In such instances, the second phase 213 appears to create a "halo" in the body 211. The peripheral region 213 of the body 211 can extend from the exterior surface 212 into the volume of the body 211 for a distance that encompasses at least a majority of the second phase 203. In particular instances, the peripheral region 213 can be defined by the region encompassing at least about 90% of the second phase between the exterior surface 212 and a boundary 214 between the exterior surface 212 and the volumetric midpoint 216 of the body. For example, the peripheral region 213 may include at least about 5%, such as at least about 10%, at least about 20%, or even at least about 25% of the total volume of the body. The central region 215 of the body 211 may be a region surrounding the volumetric midpoint 216 of the body and extending out in three dimensions to a boundary 214. The central region may be at least about 5%, such as at least about 10%, at least about 20% or even at least about 25% of the total volume of the body. The above illustration is not limiting, and it will be appreciated that various particles may be made to form a peripheral region and a central region of different sizes and shapes.

Figure 2C:
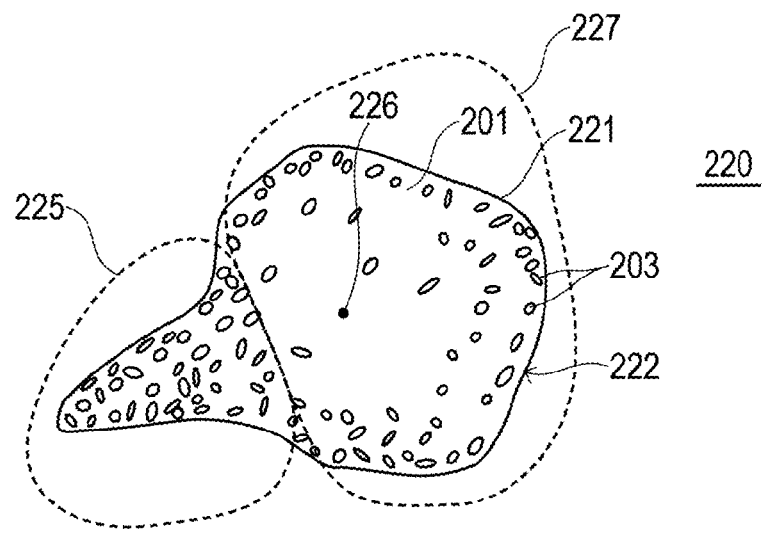
FIG. 2C includes an illustration of a particulate material including a second phase non-uniformly dispersed within the body according to an embodiment.

Moreover, it will be appreciated that the second phase can be distributed in other non-uniform manners throughout the volume of a body of particulate material. For example, FIG. 2C includes an illustration of particulate material including a second phase non-uniformly dispersed within the body according to an embodiment. As illustrated, the particulate material 220 can include a particle having a body 221 that can be formed of a first phase 202 and a second phase 203. The second phase 203 can be non-uniformly dispersed throughout the body 221, and in particular, the content of the second phase can be greatest at the external surface 222, within the body 221 and the content of the second phase can decrease with increasing distance from the external surface 222 toward the volumetric midpoint 226 within the body 221. Moreover, in certain instances, the body 221 of the particulate material can have thin regions 225, wherein the volume of the body 221 is less compared to a thick region 227. According to one embodiment, in conditions of non-uniform distribution of the second phase 203, the thin region 225 can have a greater concentration (i.e., amount of second phase per unit volume) of the second phase 203 as compared to the concentration of the second phase 203 within a thick region 227.

It will be appreciated that foregoing embodiments describing certain distributions of the second phase within the body can be the same for other phases of the particulate material. For example, as will be described in more detail herein, the particulate material can include additional phases distinct from the first and second phases (e.g., a third phase, a fourth phase, a fifth phase, etc.), and such phases can be substantially uniformly dispersed through the volume of the body, or alternatively, may be distributed in a non-uniform manner. For example, in one embodiment, the particulate material can include a body having a non-uniform distribution of a second phase and a third phase within the volume of the body. More particularly, the body can have a greater content of the second phase at a peripheral region compared to a central region, and the body may also have a greater content of the third phase at the central region compared to the peripheral region. Still, in other instances, the body can include multiple phases having different distribution characteristics. For example, the second phase may be substantially, uniformly distributed throughout the volume of the body and a third phase may be non-uniformly distributed throughout the body.

In certain embodiments, the body may further include a third phase that can be distinct from the first phase and the second phase by at least one of average grain size, composition, content, crystal structure, and a combination thereof. For example, the third phase may include a single rare earth element. The rare earth element of the third phase may be the same as the rare earth element of the second phase. Still, in an alternative embodiment, the rare earth element of the third phase may be different that the rare earth element of the second phase. According to at least one embodiment herein, the particulate material can include a body that consists essentially of the first phase, second phase, and third phase. Other alternative particulate material according to embodiments herein can include a body consisting essentially of the first phase, second phase, third phase, and a fourth phase. In yet other instances, the body can consist essentially of the first phase, second phase, a third phase, and a fifth phase.

The third phase may be an integral phase within the body. Moreover, the third phase may be substantially uniformly dispersed through the entire volume of the body. Alternatively, the third phase may be non-uniformly dispersed within the body, including for example, but not limited to, disposed in a "halo" manner as described in embodiments herein. Additionally, the third phase can be disposed within domains or between domains of any of the other phases present within the body. In yet another embodiment, the third phase may be disposed at the grain boundaries of any of the other phases, and more particularly, a majority of the third phase may be disposed as an intergranular phase (i.e., between grains at the grain boundaries) between any of the phases described in embodiments herein. Alternatively, the third phase can be disposed within the grains of any of the other phases present within the body, and more particularly, a majority of the third phase can be disposed as an intragranular phase (i.e., within the grains) within any of the grains of any of the phases described in embodiments herein.

The third phase may include an oxide, such as alumina, and more particularly a combination of alumina and a rare earth element. In one particular instance, the third phase may include lanthanum aluminate ($LaAl_{11}O_{18}$), or lanthanum aluminate compounds (e.g., $MgLaAl_{11}O_{19}$). Still, the third phase can consist essentially of lanthanum aluminate or a lanthanum aluminate compound.

In certain instances, the particulate material includes a body having a particular ratio (W1/W3), wherein W1 represents the weight percent of the first phase of the body and W3 represents the weight percent of the third phase within the body. In at least one aspect, the ratio (W1/W3), can be at least about 1, such as at least about 1.1, at least about 1.5, at least about 2, at least about 3, at least about 5, at least about 8, at least about 10, at least about 15, at least about 20, at least about 50, or even at least about 70. Still, in another embodiment the ratio (W1/W3) can be not greater than about 100, or even not greater than about 95. It will be appreciated that the body can have a ratio (W1/W3) within a range between any of the minimum and maximum values provided above.

Furthermore, in another aspect, the particulate material can include a body having a ratio (W3/W2), wherein W2 represents a weight percent of the second phase with the body and W3 represents a weight percent of the third phase within the body. In particular instances, the ratio (W3/W2) can be at least about 0.1, such as at least about 0.3, at least about 0.5, at least about 0.7, at least about 0.9, at least about 1, at least about 1.1, at least about 1.5, at least about 2, at least about 4, at least about 6, or even at least about 10. Still, in yet another embodiment, the body can have a ratio (W3/W2) that is not greater than about 10, for example, not greater than about 7, not greater than about 5, not greater than about 3, not greater than about 2.5, not greater than about 2.2, not greater than about 2, not greater than about 1.5, not greater than about 1, not greater than about 0.9, or even not greater than about 0.7. It will be appreciated that the ratio (W3/W2) can be within a range between any of the above minimum or maximum values.

The body may be formed to have a particular content of the third phase for the total weight of the body. For example, the body may include at least about 0.1 wt % of the third phase for the total weight of the body. In other instances, the body may include a greater content of the third phase, such as at least about 0.2 wt %, at least about 0.3 wt %, at least about 0.5 wt %, at least about 0.6 wt %, at least about 0.7 wt %, at least about 0.8 wt %, at least about 0.9 wt %, at least about 1 wt %, or even at least about 1.1 wt % for the total weight of the body. Still, in another embodiment, the particulate material can be formed such that the body includes not greater than about 30 wt % of the third phase for the total weight of the body. In other instances, the content of the third phase within the body can be less, such as not greater than about 20 wt %, not greater than about 15 wt %, not greater than about 13 wt %, not greater than about 12 wt %, not greater than about 10 wt %, not greater than about 9 wt %, not greater than about 8 wt %, not greater than about 7 wt %, not greater than about 6 wt %, not greater than about 4 wt %, not greater than about 3 wt %, or even not greater than about 2.5 wt %. It will be appreciated that the body can include a content of the third phase within a range between any of the minimum and maximum percentages noted above.

In accordance with another aspect, the particulate material can be formed such that the average grain size of the third phase has a particular relationship to the average grain size of the first phase and the second phase. For example, the particulate material can include a body having a first phase including a first average grain size and a third phase having a third average grain size. In certain instances, the first phase can have a first average grain size that is different than the third average grain size of the third phase. More particularly, the body can include a ratio (G1/G3) wherein G1 represents the average grain size of the first phase and G3 represents the average grain size of the third phase. In at least one instance, the ratio (G1/G3) can be not greater than about 5, such as not greater than about 2, not greater than about 1, not greater than about 0.8, not greater than about 0.5, or even not greater than about 0.2. Still, in another embodiment, the ratio (G1/G3) can be at least about 0.2, such as at least about 0.5, at least about 0.8, at least about 1, at least about 1.1, at least about 1.5, at least about 2, or even at least about 3. It will be appreciated that the ratio (G1/G3) can have a value within a range between any of the minimum or maximum values noted above.

For certain embodiments, the second phase can have a second average grain size that is different than the third average grain size of the third phase, and more particularly, may be less than the third average grain size of the third phase. In at least one instance, the body can have a ratio (G2/G3) wherein G2 represents the second average grain size of the second phase and G3 represents the third average grain size of the third phase. The ratio (G2/G3) can be at least about 0.2, such as at least about 0.5, at least about 0.8, at least about 1, at least about 1.1, at least about 1.5, at least about 2, or even at least about 3. Still, in accordance with another embodiment, the ratio (G2/G3) may not be greater than about 3, such as not greater than about 2, not greater than about 1, not greater than about 0.8, not greater than about 0.5, or even not greater than about 0.2. It will be appreciated that the ratio (G2/G3) can be within a range between any of the minimum and maximum values note above.

The body can include a third phase having an average grain size of not greater than 500 μm. In other instances, the average grain size of the third phase may be less, such as not greater than about 250 μm, not greater than about 100 μm, not greater than about 50 μm, not greater than about 1 μm, not greater than about 0.8 μm, not greater than about 0.5 μm, or even not greater than about 0.2 μm. Still, the average grain size of the third phase may be at least about 0.1 μm, at least about at least about 1 μm, at least about 3 μm, at least about 5 μm, or even at least about 10 μm. It will be appreciated that the third phase can have an average grain size within a range of the minimum and maximum values noted above.

In accordance with yet another embodiment, the particulate material may be formed such that the body includes a fourth phase. The fourth phase can be distinct from the first phase, second phase and/or the third phase. The fourth phase may be distinct from the first phase, second phase, and third phase by at least one of an average grain size, composition, content, crystal structure, and a combination thereof. The fourth phase may be an integral phase within the body. Moreover, the fourth phase may be substantially uniformly dispersed through the entire volume of the body. Alternatively, the fourth phase may be non-uniformly dispersed within the body, including for example, but not limited to, disposed in a "halo" manner as described in embodiments herein. Additionally, the fourth phase can be disposed within domains or between domains of any of the other phases present within the body. The fourth phase may be disposed at the grain boundaries of any of the other phases, and more particularly, a majority of the fourth phase may be disposed as an intergranular phase (i.e., between grains at the grain boundaries) between any of the phases described in embodiments herein. Alternatively, the fourth phase can be disposed within the grains of any of the other phases present within the body, and more particularly, a majority of the fourth phase can be disposed as an intragranular phase (i.e., within the grains) within any of the grains of any of the phases described in embodiments herein.

Certain embodiments herein can include a particulate material having a body consisting essentially of the first phase, second phase, and the fourth phase. Other alternative particulate material according to embodiments herein can include a body consisting essentially of the first phase, second phase, third phase, and fourth phase. In yet other instances, the body can consist essentially of the first phase, second phase, fourth phase, and a fifth phase.

In accordance with one embodiment, the fourth phase can include an inorganic material, such as an oxide, and more particularly, a metal oxide compound. The fourth phase may include a transition metal element, and more particularly, may include chromium. In accordance with one particular embodiment, the fourth phase can include chromium oxide, and may consist essentially of chromium oxide.

The body may include a particular content of the fourth phase. For example, in at least one embodiment, the body can include at least 0.2 wt % of the fourth phase for the total weight of the body. In other instances, the content of the fourth phase within the body may be greater, such as at least about 0.3 wt %, at least about 0.5 wt %, at least about 0.7 wt %, at least about 0.8 wt %, at least about 0.9 wt %, at least about 1.0 wt %, or even at least about 1.1 wt %. Still, the content of the fourth phase within the body may be not greater than about 20 wt %, such as not greater than about 15 wt %, not greater than about 10 wt %, not greater than about 8 wt %, not greater than about 5 wt %, not greater than about 4 wt %, not greater than about 3 wt %, not greater than about 2.5 wt %, or even not greater than about 2 wt %. It will be appreciated that the total content of the fourth phase within the body may be within a range between any of the minimum and maximum values noted above.

In accordance with one embodiment, the body can contain a particular amount of the fourth phase with respect to the content of the first phase. For example, the body can include a ratio (W1/W4), wherein W1 represents a weight percent of the first phase within the body and W4 represents a weight percent of the fourth phase within the body. In accordance within an embodiment, the ratio (W1/W4) can be at least about 1, such as at least about 1.1, at least about 1.5, at least about 2, at least about 3, at least about 5, at least about 8, at least about 10, at least about 15, at least about 20, at least about 50, or even at least about 70. Still, the ratio (W1/W4) may be not greater than about 100, or even not greater than about 95. It will be appreciated that the ratio (W1/W4) may have a value within a range between any of the above minimum and maximum values.

In accordance with an embodiment, the particulate material may be formed such that the body comprises a particular content of the fourth phase relative to the content of the second phase. For example, the body can have ratio (W4/W2), wherein W2 represents a weight percent of the second phase with the body and W4 represents a weight percent of the fourth phase within the body. In accordance with an embodiment, the ratio (W4/W2) can be about 0.1, such as at least about 0.3, at least about 0.5, at least about 0.7, at least about 0.9, at least about 1, or even at least about 1.1. In yet another embodiment, the ratio (W4/W2) may be not greater than about 10, such as not greater than about 7, not greater than about 5, not greater than about 3, not greater than about 2, not greater than about 1, or even not greater than about 0.8. It will be appreciated that the ratio (W4/W2) can be within a range between any of the above minimum or maximum values.

Furthermore, the body can have a particular ratio of the content of the third phase relative to a content of the fourth phase. For example, the body can include a ratio (W3/W4), wherein W3 represents a weight percent of the third phase within the body and W4 represents a weight percent of the fourth phase within the body. In accordance within an embodiment, the ratio (W3/W4) can be at least about 1, such as at least about 1.1, at least about 1.5, at least about 2, at least about 3, at least about 5, at least about 8, at least about 10, at least about 15, at least about 20, at least about 50, or even at least about 70. Still, the ratio (W3/W4) may be not greater than about 100, or even not greater than about 95, not greater than about 80, not greater than about 50, not greater than about 30, not greater than about 10, not greater than about 5, not greater than about 3, not greater than about 2, not greater than about 1, or even not greater than about 0.8.

It will be appreciated that the ratio (W3/W4) may have a value within a range between any of the above minimum and maximum values.

In accordance with another aspect, the particulate material can be formed such that the average grain size of the fourth phase has a particular relationship to the average grain size of the first phase, second phase, and/or the third phase. For example, the particulate material can include a body having a first phase including a first average grain size and a fourth phase having a fourth average grain size. In particular instances, the first phase can have a first average grain size that is different than the fourth average grain size of the fourth phase. More particularly, the body can include a ratio (G1/G4), wherein G1 represents the average grain size of the first phase and G4 represents the average grain size of the fourth phase. In at least one instance, the ratio (G1/G4) can be not greater than about 5, such as not greater than about 2, not greater than about 1, not greater than about 0.8, not greater than about 0.5, or even not greater than about 0.2. Still, in another embodiment, the ratio (G1/G4) can be at least about 0.2, such as at least about 0.5, at least about 0.8, at least about 1, at least about 1.1, at least about 1.5, at least about 2, or even at least about 3. It will be appreciated that the ratio (G1/G4) can have a value within a range between any of the minimum or maximum values noted above.

The second phase can have a second average grain size that is different than the fourth average grain size of the fourth phase, and more particularly, may be less than or greater than the fourth average grain size of the fourth phase. In at least one instance, the body can have a ratio (G2/G4), wherein G2 represents the second average grain size of the second phase and G4 represents the fourth average grain size of the fourth phase. The ratio (G2/G4) can be at least about 0.2, such as at least about 0.5, at least about 0.8, at least about 1, at least about 1.1, at least about 1.5, at least about 2, or even at least about 3. Still, in accordance with another embodiment, the ratio (G2/G4) may not be greater than about, such as not greater than about 2, not greater than about 1, not greater than about 0.8, not greater than about 0.5, or even not greater than about 0.2. It will be appreciated that the ratio (G2/G4) can be within a range between any of the minimum and maximum values note above.

The third phase can have a third average grain size that is different than the fourth average grain size of the fourth phase, and more particularly, may be greater than or less than the fourth average grain size of the fourth phase. In at least one instance, the body can have a ratio (G3/G4), wherein G3 represents the third average grain size of the third phase and G4 represents the fourth average grain size of the fourth phase. The ratio (G3/G4) can be at least about 0.2, such as at least about 0.5, at least about 0.8, at least about 1, at least about 1.1, at least about 1.5, at least about 2, or even at least about 3. Still, in accordance with another embodiment, the ratio (G3/G4) may not be greater than about, such as not greater than about 2, not greater than about 1, not greater than about 0.8, not greater than about 0.5, or even not greater than about 0.2. It will be appreciated that the ratio (G3/G4) can be within a range between any of the minimum and maximum values note above.

For particulate material having a body including a fourth phase, the body may have a particular average grain size of the fourth phase. For example, the average grain size of the fourth phase can be not greater than 500 µm. In other instances, the average grain size of the fourth phase may be less, such as not greater than about 250 µm, not greater than about 100 µm, not greater than about 50 µm, not greater than about 1 µm, not greater than about 0.8 µm, not greater than about 0.5 µm, or even not greater than about 0.2 µm. Still, the average grain size of the fourth phase may be at least about 1 nm, such as at least about 0.01 µm, at least about 0.1 µm, at least about at least about 1 µm, at least about 3 µm, at least about 5 µm, or even at least about 10 µm. It will be appreciated that the fourth phase can have an average grain size within a range of the minimum and maximum values noted above.

In accordance with an embodiment, the particulate material can include a body having a fifth phase. The fifth phase may be distinct from the first phase, second phase, third phase, and fourth phase by at least one of an average grain size, content, composition, crystal structure, and a combination thereof. The fifth phase may be an integral phase within the body. Moreover, the fifth phase may be substantially uniformly dispersed through the entire volume of the body. Alternatively, the fifth phase may be non-uniformly dispersed within the body, including for example, but not limited to, disposed in a "halo" manner as described in embodiments herein. Additionally, the fifth phase can be disposed within domains or between domains of any of the other phases present within the body. In yet another embodiment, the fifth phase may be disposed at the grain boundaries of any of the other phases, and more particularly, a majority of the fifth phase may be disposed as an intergranular phase (i.e., between grains at the grain boundaries) between any of the phases described in embodiments herein. Alternatively, the fifth phase may be disposed as an intragranular phase (i.e., within the grains) within any of the grains of any of the phases described in embodiments herein, and more particularly, a majority of the fifth phase may be present as an intragranular phase.

Furthermore, it will be appreciated that reference to any of the phases in any embodiment does not require the existence of the all the phases to be present. For example, the fifth phase may be present within the body without the existence of the third phase and/or fourth phase. Certain embodiments herein can include a particulate material having a body consisting essentially of the first phase, second phase, and the fifth phase. Other particulate material according to embodiments herein can include a body consisting essentially of the first phase, second phase, third phase, and fifth phase. In yet other instances, the body can consist essentially of the first phase, second phase, fourth phase, and the fifth phase.

The body can include a fifth phase that may include phosphorous, and more particularly, a compound including phosphate ($PO_4$). In at least one embodiment, the fifth phase can include a compound including phosphorous, and at least one element of the group of alumina, chromium, and any combination thereof. In another embodiment, the fifth phase may include free phosphate. Moreover, the fifth phase may be formed of a compound that is essentially free of a rare earth element.

The body may include a particular content of the fifth phase. For example, in at least one embodiment, the body can include at least 0.2 wt % of the fifth phase for the total weight of the body. In other instances, the content of the fifth phase within the body may be greater, such as at least about 0.3 wt %., at least about 0.5 wt %, at least about 0.7 wt %, at least about 0.8 wt %, at least about 0.9 wt %, at least about 1.0 wt %, or even at least about 1.1 wt %. Still, the content of the fifth phase within the body may be not greater than about 20 wt %, such as not greater than about 15 wt %, not greater than about 10 wt %, not greater than about 8 wt %, not greater than about 5 wt %, not greater than about 4 wt %, not greater than about 3 wt %, not greater than about 2.5 wt %, or even not greater than about 2 wt %. It will be appreciated that the total content of the fifth phase within the body may be within a range between any of the minimum and maximum values noted above.

The body may include a specific content of the fifth phase relative to other phases. For example, the body can include a greater content of the first phases as compared to the fifth phase. Additionally or alternatively, the body can include a greater content of the second phases compared to the fifth phase. Moreover, the body may include a greater content of the third phase and or fourth phases compared to the fifth phase.

In accordance with one embodiment, the body can contain a particular amount of the fifth phase with respect to the content of the first phase. For example, the body can include a ratio (W1/W5), wherein W1 represents a weight percent of the first phase within the body and W5 represents a weight percent of the fifth phase within the body. In accordance within an embodiment, the ratio (W1/W5) can be at least about 1, such as at least about 1.1, at least about 1.5, at least about 2, at least about 3, at least about 5, at least about 8, at least about 10, at least about 15, at least about 20, at least about 50, or even at least about 70. Still, the ratio (W1/W5) may be not greater than about 100, or even not greater than about 95. It will be appreciated that the ratio (W1/W5) may have a value within a range between any of the above minimum and maximum values.

The particulate material may be formed such that the body comprises a particular content of the fifth phase relative to the content of the second phase. For example, the body can have ratio (W5/W2), wherein W2 represents a weight percent of the second phase with the body and W5 represents a weight percent of the fifth phase within the body. In accordance with an embodiment, the ratio (W5/W2) may be not greater than about 10, such as not greater than about 7, not greater than about 3, not greater than about 1, not greater than about 0.8, not greater than about 0.5, not greater than about 0.3, or even not greater than about 0.1. Still, in at least one embodiment, the ratio (W5/W2) can be at least about 0.1, such as at least about 0.3, at least about 0.5, at least about 0.7, at least about 0.9, at least about 1, at least about 1.1, at least about 1.5, at least about 2, at least about 3, or even at least about 5. It will be appreciated that the ratio (W5/W2) can be within a range between any of the above minimum or maximum values.

Furthermore, certain particulate material according to an embodiment herein may include a body having a particular ratio of the content of the third phase relative to a content of the fifth phase. For example, the body can include a ratio (W3/W5), wherein W3 represents a weight percent of the third phase within the body and W5 represents a weight percent of the fifth phase within the body. In accordance within an embodiment, the ratio (W3/W5) can be at least about 1, such as at least about 1.1, at least about 1.5, at least about 2, at least about 3, at least about 5, at least about 8, at least about 10, at least about 15, at least about 20, at least about 50, or even at least about 70. Still, the ratio (W3/W5) may be not greater than about 100, or even not greater than about 95, not greater than about 80, not greater than about 50, not greater than about 30, not greater than about 10, not greater than about 5, not greater than about 3, not greater than about 2, not greater than about 1, or even not greater than about 0.8. It will be appreciated that the ratio (W3/W5) may have a value within a range between any of the above minimum and maximum values.

In one aspect, a particulate material according to an embodiment herein may include a body having a particular ratio of the content of the fourth phase relative to a content of the fifth phase. For example, the body can include a ratio (W4/W5), wherein W4 represents a weight percent of the fourth phase within the body and W5 represents a weight percent of the fifth phase within the body. In accordance within an embodiment, the ratio (W4/W5) can be at least about 1, such as at least about 1.1, at least about 1.5, at least about 2, at least about 3, at least about 5, at least about 8, at least about 10, at least about 15, at least about 20, at least about 50, or even at least about 70. Still, the ratio (W4/W5) may be not greater than about 100, or even not greater than about 95, not greater than about 80, not greater than about 50, not greater than about 30, not greater than about 10, not greater than about 5, not greater than about 3, not greater than about 2, not greater than about 1, or even not greater than about 0.8. It will be appreciated that the ratio (W4/W5) may have a value within a range between any of the above minimum and maximum values.

In accordance with another aspect, the particulate material can be formed such that the average grain size of the fifth phase may have a particular relationship to the average grain size of the first phase, second phase, third phase, and/or fourth phase. For example, the particulate material can include a body having a first phase including a first average grain size and a fifth phase having a fifth average grain size. In particular instances, the first phase can have a first average grain size that is different than the fifth average grain size of the fifth phase. More particularly, the body can include a ratio (G1/G5), wherein G1 represents the average grain size of the first phase and G5 represents the average grain size of the fifth phase. In at least one instance, the ratio (G1/G5) can be not greater than about 5, such as not greater than about 2, not greater than about 1, not greater than about 0.8, not greater than about 0.5, or even not greater than about 0.2. Still, in another embodiment, the ratio (G1/G5) can be at least about 0.2, such as at least about 0.5, at least about 0.8, at least about 1, at least about 1.1, at least about 1.5, at least about 2, or even at least about 3. It will be appreciated that the ratio (G1/G5) can have a value within a range between any of the minimum or maximum values noted above.

For certain embodiments, the second phase can have a second average grain size that is different than the fifth average grain size of the fifth phase, and more particularly, may be greater than or less than the fifth average grain size of the fifth phase. In at least one instance, the body can have a ratio (G2/G5), wherein G2 represents the second average grain size of the second phase and G5 represents the fifth average grain size of the fifth phase. The ratio (G2/G5) can be at least about 0.2, such as at least about 0.5, at least about 0.8, at least about 1, at least about 1.1, at least about 1.5, at least about 2, or even at least about 3. Still, in accordance with another embodiment, the ratio (G2/G5) may not be greater than about, such as not greater than about 2, not greater than about 1, not greater than about 0.8, not greater than about 0.5, or even not greater than about 0.2. It will be appreciated that the ratio (G2/G5) can be within a range between any of the minimum and maximum values note above.

The third phase can have a third average grain size that is different than the fifth average grain size of the fifth phase, and more particularly, may be greater than or less than the fifth average grain size of the fifth phase. In at least one instance, the body can have a ratio (G3/G5), wherein G3 represents the third average grain size of the third phase and G5 represents the fifth average grain size of the fifth phase. The ratio (G3/G5) can be at least about 0.2, such as at least about 0.5, at least about 0.8, at least about 1, at least about 1.1, at least about 1.5, at least about 2, or even at least about 3. Still, in accordance with another embodiment, the ratio (G3/G5) may not be greater than about, such as not greater than about 2, not greater than about 1, not greater than about 0.8, not greater than about 0.5, or even not greater than about 0.2. It will be appreciated that the ratio (G3/G5) can be within a range between any of the minimum and maximum values note above.

For certain embodiments, the fourth phase can have a fourth average grain size that is different than the fifth average grain size of the fifth phase, and more particularly, may be greater than or less than the fifth average grain size of the fifth phase. In at least one instance, the body can have a ratio (G4/G5), wherein G4 represents the fourth average grain size of the fourth phase and G5 represents the fifth average grain size of the fifth phase. The ratio (G4/G5) can be at least about 0.2, such as at least about 0.5, at least about 0.8, at least about 1, at least about 1.1, at least about 1.5, at least about 2, or even at least about 3. Still, in accordance with another embodiment, the ratio (G4/G5) may not be greater than about, such as not greater than about 2, not greater than about 1, not greater than about 0.8, not greater than about 0.5, or even not greater than about 0.2. It will be appreciated that the ratio (G4/G5) can be within a range between any of the minimum and maximum values note above.

For particulate material having a body including a fifth phase, the body may have a particular average grain size of the fifth phase. For example, the average grain size of the fifth phase can be not greater than 500 μm. In other instances, the average grain size of the fifth phase may be less, such as not greater than about 250 μm, not greater than about 100 μm, not greater than about 50 μm, not greater than about 1 μm, not greater than about 0.8 μm, not greater than about 0.5 μm, or even not greater than about 0.2 μm. Still, the average grain size of the fifth phase may be at least about 1 nm, such as at least about 0.01 μm, at least about 0.1 μm, at least about at least about 1 μm, at least about 3 μm, at least about 5 μm, or even at least about 10 μm. It will be appreciated that the fifth phase can have an average grain size within a range of the minimum and maximum values noted above.

In yet another embodiment, the body can be in the form of a shaped abrasive particle. A shaped abrasive particle can have a body configured to have a predetermined shape. Shaped abrasive particles may differ from conventional crushed grains, which generally have an irregular shape. When considered as a batch, shaped abrasive particles can be characterized by one or more features that may be, but not necessarily need be, linked to one or more conditions of forming, such that the one or more features may be substantially replicated from particle-to-particle. Moreover, the one or more features may be evident within at least a majority of the particles in a batch. Conventional crushed grains generally have a random shape. Shaped abrasive particles may be obtained through various processing methods, including but not limited to, printing, molding, pressing, stamping, casting, extruding, cutting, fracturing, heating, cooling, crystallizing, rolling, embossing, depositing, etching, scoring, and a combination thereof.

One non-limiting process of forming a shaped abrasive particle can be initiated by forming a mixture including a ceramic material and a liquid. In particular, the mixture can be a gel formed of a ceramic powder material and a liquid, wherein the gel can be characterized as a shape-stable material having the ability to substantially hold a given shape even in the green (i.e., unfired) state. In accordance with an embodiment, the gel can be formed of the ceramic powder material as an integrated network of discrete particles. The mixture may contain a certain content of solid material, liquid material, and additives such that it has suitable rheological characteristics. That is, in certain instances, the mixture can have a certain viscosity, and more particularly, suitable rheological characteristics that form a dimensionally stable phase of material that can be formed through the process as noted herein. A dimensionally stable phase of material is a material that can be formed to have a particular shape and substantially maintain the shape, such that the shape is substantially present in the finally-formed object.

The ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina. The mixture can be formed to have a particular content of solid material, such as the ceramic powder material. For example, in one embodiment, the mixture can have a solids content of at least about 25 wt % and not greater than about 75 wt % for the total weight of the mixture. Furthermore, the mixture 101 can be formed to have a particular content of liquid material, including for example, a liquid content of at least about 25 wt % and not greater than about 75 wt % for the total weight of the mixture 101.

Furthermore, to facilitate processing and forming shaped abrasive particles according to embodiments herein, the mixture can have a particular storage modulus, such as at least about $1 \times 10^4$ Pa, at least about $4 \times 10^4$ Pa, or even at least about $5 \times 10^4$ Pa. However, in at least one non-limiting embodiment, the mixture may have a storage modulus of not greater than about $1 \times 10^7$ Pa, such as not greater than about $2 \times 10^6$ Pa. It will be appreciated that the storage modulus of the mixture 101 can be within a range between any of the minimum and maximum values noted above. The storage modulus can be measured via a parallel plate system using ARES or AR-G2 rotational rheometers, with Peltier plate temperature control systems. For testing, the mixture 101 can be extruded within a gap between two plates that are set to be approximately 8 mm apart from each other. After extruding the gel into the gap, the distance between the two plates defining the gap is reduced to 2 mm until the mixture 101 completely fills the gap between the plates. After wiping away excess mixture, the gap is decreased by 0.1 mm and the test is initiated. The test is an oscillation strain sweep test conducted with instrument settings of a strain range between 01% to 100%, at 6.28 rad/s (1 Hz), using 25-mm parallel plate and recording 10 points per decade. Within 1 hour after the test completes, lower the gap again by 0.1 mm and repeat the test. The test can be repeated at least 6 times. The first test may differ from the second and third tests. Only the results from the second and third tests for each specimen should be reported.

Furthermore, to facilitate processing and forming shaped abrasive particles according to embodiments herein, the mixture can have a particular viscosity. For example, the mixture can have a viscosity of at least about $4 \times 10^3$ Pa s, at least about $5 \times 10^3$ Pa s, at least about $6 \times 10^3$ Pa s, at least about $8 \times 10^3$ Pa s, at least about $10 \times 10^3$ Pa s, at least about $20 \times 10^3$ Pa s, at least about $30 \times 10^3$ Pa s, at least about $40 \times 10^3$ Pa s, at least about $50 \times 10^3$ Pa s, at least about $60 \times 10^3$ Pa s, at least about $65 \times 10^3$ Pa s. In at least one non-limiting embodiment, the mixture may have a viscosity of not greater than about $100\times10^3$ Pa s, not greater than about $95\times10^3$ Pa s, not greater than about $90\times10^3$ Pa s, or even not greater than about $85\times10^3$ Pa s. It will be appreciated that the viscosity of the mixture can be within a range between any of the minimum and maximum values noted above. The viscosity can be measured in the same manner as the storage modulus as described above.

Moreover, the mixture can be formed to have a particular content of organic materials, including for example, organic additives that can be distinct from the liquid, to facilitate processing and formation of shaped abrasive particles according to the embodiments herein. Some suitable organic additives can include stabilizers, binders, such as fructose, sucrose, lactose, glucose, UV curable resins, and the like.

Notably, the process of forming a shaped abrasive particle may utilize a mixture that can be distinct from slurries used in conventional forming operations. For example, the content of organic materials, within the mixture, particularly, any of the organic additives noted above, may be a minor amount as compared to other components within the mixture. In at least one embodiment, the mixture can be formed to have not greater than about 30 wt % organic material for the total weight of the mixture. Moreover, the mixture can be formed to have a particular content of acid or base distinct from the liquid, to facilitate processing and formation of shaped abrasive particles according to the embodiments herein. Some suitable acids or bases can include nitric acid, sulfuric acid, citric acid, chloric acid, tartaric acid, phosphoric acid, ammonium nitrate, ammonium citrate.

Various systems may be used to shape the mixture and form precursor shaped abrasive particles. Still, in one particular embodiment including a screen printing operation, the mixture can be configured to be extruded through a die opening, and during extrusion within an application zone, a screen having a plurality of openings can travel under the die opening. In accordance with an embodiment, the openings can have a two-dimensional shape as viewed in a plane defined by the length (l) and width (w) of the screen that include various shapes, for example, polygons, ellipsoids, numerals, Greek alphabet letters, Latin alphabet letters, Russian alphabet characters, complex shapes including a combination of polygonal shapes, and a combination thereof. In particular instances, the openings may have two-dimensional polygonal shapes such as, a triangle, a rectangle, a quadrilateral, a pentagon, a hexagon, a heptagon, an octagon, a nonagon, a decagon, and a combination thereof. The shape of the openings may facilitate substantial formation of one or more features of the shaped abrasive particles.

After forcing the mixture through the die opening and into the openings in the screen, precursor shaped abrasive particles may be printed on a belt disposed under the screen. During the process of extruding the mixture into the openings of the screen the belt may be in contact with the screen. Alternatively, the belt may be spaced apart from the screen. Notably, the mixture can be forced through the screen in rapid fashion, such that the average residence time of the mixture within the openings can be less than about 2 minutes, less than about 1 minute, less than about 40 second, or even less than about 20 seconds. In particular non-limiting embodiments, the mixture may be substantially unaltered during printing as it travels through the screen openings, thus experiencing no change in the amount of components from the original mixture, and may experience no appreciable drying in the openings of the screen.

The precursor shaped abrasive particles may be translated through a series of zones wherein various treating processes may be conducted. Some suitable exemplary treating processes can include drying, heating, curing, reacting, radiating, mixing, stirring, agitating, planarizing, calcining, sintering, comminuting, sieving, doping, and a combination thereof. According to one embodiment, the precursor shaped abrasive particles may be translated through an optional shaping zone, wherein at least one exterior surface of the particles may be shaped as described in embodiments herein. Furthermore, the precursor shaped abrasive particles may be translated through an application zone wherein one or more additives can be applied to the precursor shaped abrasive particles, which can be the same process of providing an additive to the raw material powder as described in embodiments herein. Within the application zone, the additive material may be applied utilizing various methods including for example, spraying, dipping, depositing, impregnating, transferring, punching, cutting, pressing, and any combination thereof. And further, the precursor shaped abrasive particles may be translated on the belt through a post-forming zone, wherein a variety of processes, including for example, drying, firing, sintering may be conducted on the precursor shaped abrasive particles to form shaped abrasive particles.

In accordance with another aspect, the particulate material of embodiments herein may be part of a batch. A batch of particulate material can have at least one predetermined classification characteristic including, but not limited to, average particle size, particle shape, density, specific surface area, hardness, friability, particle color, hardness, friability, toughness, density, specific surface area, and a combination thereof.

In accordance with one particular embodiment, the batch of particulate material can include a first portion comprising a first plurality of particulate material and a second portion comprising a second plurality of particulate material. Notably, the particulate material of the first plurality may be distinct from the second portion based on one or more predetermined classification characteristics or other particle parameters. For example, the difference between the first portion and the second portion may be based upon factors including, but not limited to, average particle size, composition, size, shape, hardness, friability, toughness, density, specific surface area, and a combination thereof. In one instance, the first portion can include a particulate material having a first content of the second phase including the phosphorous-containing material and the second portion of particulate material within the batch can have a second content of the second phase of material including the phosphorous-containing material that is different than the first content of the second phase material from the first portion. Still, in other embodiments, the content of second phase material within the first portion and the second portion may be substantially the same.

In another embodiment, the first portion can include a particulate material having a first dispersion of the second phase within each the bodies of the particulate material and the second portion of the batch can include a particulate material, wherein each particulate material has a body having a distribution of the second phase that can be different than the nature of the dispersion of the second phase within the first portion. For example, the first portion can include a particulate material, wherein the body of each particulate material within the first portion has a second phase that can be substantially uniformly dispersed throughout the volume of the body. By contrast, the batch may also include a second portion, wherein each body of the particulate material of the second portion has a non-uniformly dispersed second phase, including for example, a "halo" arrangement of the second phase within the body.

In other embodiments, the batch can include a plurality of particulate material, and more notably a particle-to-particle variation of the second phase of not greater than about 50%. Reference herein to a particle-to-particle variation includes a standard deviation of the second phase within the particulate material of the batch, which may be obtained from a statistically relevant and random sampling of the particulate material of the batch. Accordingly, a particle-to-particle variation of the second phase can be a measure of the variation in content of the second phase from particle-to-particle within the batch. In other embodiments, the particle-to-particle variation of the second phase can be less, such as not greater than about 40%, not greater than about 30%, not greater than about 20%, not greater than about 15%, not greater than about 10%, or even not greater than about 5%.

The body of the shaped abrasive particle can have a particular two-dimensional shape. For example, the body can have a two-dimensional shape as viewed in a plane define by the length and width having a polygonal shape, ellipsoidal shape, a numeral, a Greek alphabet character, Latin alphabet character, Russian alphabet character, complex shapes utilizing a combination of polygonal shapes and a combination thereof. Particular polygonal shapes include triangular, rectangular, quadrilateral, pentagon, hexagon, heptagon, octagon, nonagon, decagon, any combination thereof. Other irregular polygonal shapes may also be utilized, including for example, star-shaped particles, cross-shaped particles, truncated triangular-shaped particles, and the like.

Figure 3A:
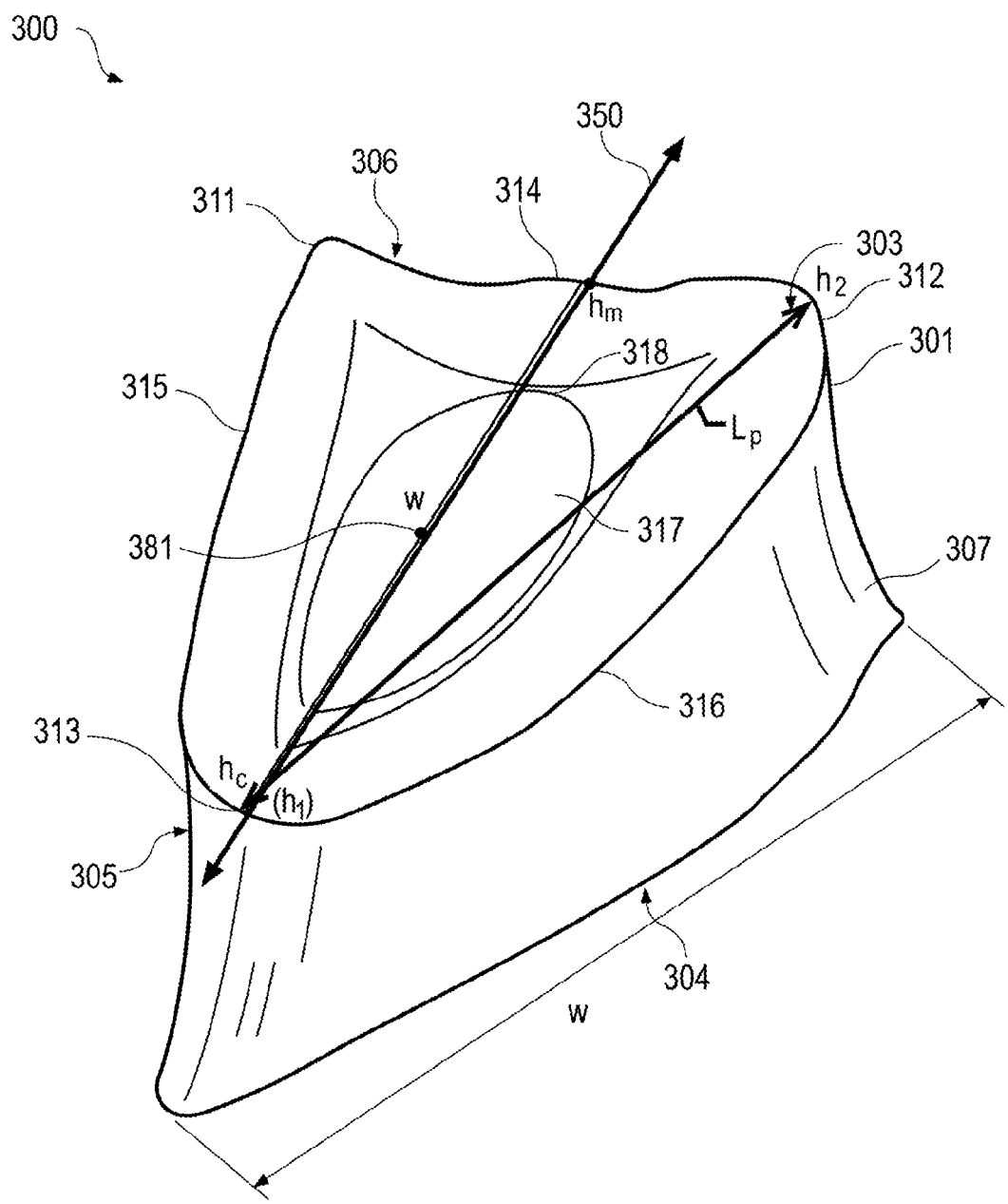
FIG. 3A includes a perspective view illustration of an abrasive particle in accordance with an embodiment.
Figure 3B:
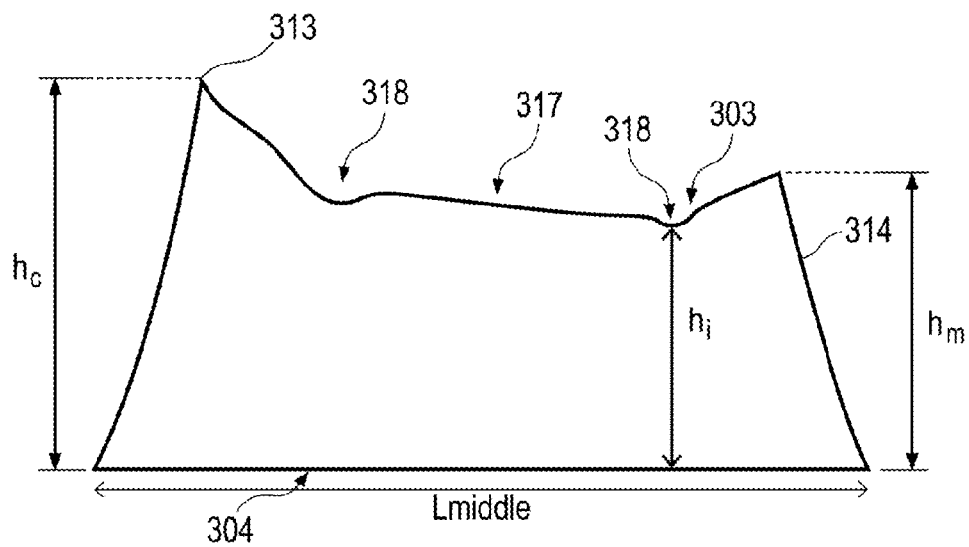
FIG. 3B includes a cross-sectional illustration of the abrasive particle of FIG. 3A.

FIG. 3A includes a perspective view illustration of an abrasive particle in accordance with one embodiment. Additionally, FIG. 3B includes a cross-sectional illustration of the abrasive particle of FIG. 3A. The body 301 includes an upper surface 303 a bottom major surface 304 opposite the upper surface 303. The upper surface 303 and the bottom surface 304 can be separated from each other by side surfaces 305, 306, and 307. As illustrated, the body 301 of the shaped abrasive particle 300 can have a generally triangular shape as viewed in a plane of the upper surface 303. In particular, the body 301 can have a length (Lmiddle) as shown in FIG. 3B, which may be measured at the bottom surface 304 of the body 301 and extending from a corner 313 through a midpoint 381 of the body 301 to a midpoint at the opposite edge 314 of the body. Alternatively, the body can be defined by a second length or profile length (Lp), which is the measure of the dimension of the body from a side view at the upper surface 303 from a first corner 313 to an adjacent corner 312. Notably, the dimension of Lmiddle can be a length defining a distance between a height at a corner (hc) and a height at a midpoint edge (hm) opposite the corner. The dimension Lp can be a profile length along a side of the particle defining the distance between h1 and h2. Reference herein to the length can be reference to either Lmiddle or Lp.

The body 301 can further include a width (w) that is the longest dimension of the body and extending along a side. The shaped abrasive particle can further include a height (h), which may be a dimension of the shaped abrasive particle extending in a direction perpendicular to the length and width in a direction defined by a side surface of the body 301. Notably, as will be described in more detail herein, the body 301 can be defined by various heights depending upon the location on the body. In specific instances, the width can be greater than or equal to the length, the length can be greater than or equal to the height, and the width can be greater than or equal to the height.

Moreover, reference herein to any dimensional characteristic (e.g., h1, h2, hi, w, Lmiddle, Lp, and the like) can be reference to a dimension of a single particle of a batch, a median value, or an average value derived from analysis of a suitable sampling of particles from a batch. Unless stated explicitly, reference herein to a dimensional characteristic can be considered reference to a median value that is a based on a statistically significant value derived from a sample size of suitable number of particles of a batch of particles. Notably, for certain embodiments herein, the sample size can include at least 40 randomly selected particles from a batch of particles. A batch of particles may be a group of particles that are collected from a single process run, and more particularly, may include an amount of shaped abrasive particles suitable for forming a commercial grade abrasive product, such as at least about 20 lbs. of particles.

In accordance with an embodiment, the body 301 of the shaped abrasive particle can have a first corner height (hc) at a first region of the body defined by a corner 313. Notably, the corner 313 may represent the point of greatest height on the body 301, however, the height at the corner 313 does not necessarily represent the point of greatest height on the body 301. The corner 313 can be defined as a point or region on the body 301 defined by the joining of the upper surface 303, and two side surfaces 305 and 307. The body 301 may further include other corners, spaced apart from each other, including for example, corner 311 and corner 312. As further illustrated, the body 301 can include edges 314, 315, and 316 that can separated from each other by the corners 311, 312, and 313. The edge 314 can be defined by an intersection of the upper surface 303 with the side surface 306. The edge 315 can be defined by an intersection of the upper surface 303 and side surface 305 between corners 311 and 313. The edge 316 can be defined by an intersection of the upper surface 303 and side surface 307 between corners 312 and 313.

As further illustrated, the body 301 can include a second midpoint height (hm) at a second end of the body, which can be defined by a region at the midpoint of the edge 314, which can be opposite the first end defined by the corner 313. The axis 350 can extend between the two ends of the body 301. FIG. 3B is a cross-sectional illustration of the body 301 along the axis 350, which can extend through a midpoint 381 of the body along the dimension of length (Lmiddle) between the corner 313 and the midpoint of the edge 314.

In accordance with an embodiment, the shaped abrasive particles of the embodiments herein, including for example, the particle of FIGS. 3A and 3B can have an average difference in height, which is a measure of the difference between hc and hm. For convention herein, average difference in height will be generally identified as hc−hm, however it is defined an absolute value of the difference and it will be appreciated that average difference in height may be calculated as hm-hc when the height of the body 301 at the midpoint of the edge 314 is greater than the height at the corner 313. More particularly, the average difference in height can be calculated based upon a plurality of shaped abrasive particles from a suitable sample size, such as at least 40 particles from a batch as defined herein. The heights hc and hm of the particles can be measured using a STIL (Sciences et Techniques Industrielles de la Lumiere-France) Micro Measure 3D Surface Profilometer (white light (LED) chromatic aberration technique) and the average difference in height can be calculated based on the average values of hc and hm from the sample.

As illustrated in FIG. 3B, in one particular embodiment, the body 301 of the shaped abrasive particle may have an average difference in height at different locations at the body. The body can have an average difference in height, which can be the absolute value of [hc−hm] between the first corner height (hc) and the second midpoint height (hm) is at least about 20 microns. It will be appreciated that average difference in height may be calculated as hm−hc when the height of the body 301 at a midpoint of the edge is greater than the height at an opposite corner. In other instances, the average difference in height [hc−hm], can be at least about 25 microns, at least about 30 microns, at least about 36 microns, at least about 40 microns, at least about 60 microns, such as at least about 65 microns, at least about 70 microns, at least about 75 microns, at least about 80 microns, at least about 90 microns, or even at least about 100 microns. In one non-limiting embodiment, the average difference in height can be not greater than about 300 microns, such as not greater than about 250 microns, not greater than about 220 microns, or even not greater than about 180 microns. It will be appreciated that the average difference in height can be within a range between any of the minimum and maximum values noted above. Moreover, it will be appreciated that the average difference in height can be based upon an average value of hc. For example, the average height of the body at the corners (Ahc) can be calculated by measuring the height of the body at all corners and averaging the values, and may be distinct from a single value of height at one corner (hc). Accordingly, the average difference in height may be given by the absolute value of the equation [Ahc−hi]. Furthermore, it will be appreciated that the average difference in height can be calculated using a median interior height (Mhi) calculated from a suitable sample size from a batch of shaped abrasive particles and an average height at the corners for all particles in the sample size. Accordingly, the average difference in height may be given by the absolute value of the equation [Ahc−Mhi].

In particular instances, the body 301 can be formed to have a primary aspect ratio, which is a ratio expressed as width:length, having a value of at least 1:1. In other instances, the body can be formed such that the primary aspect ratio (w:1) is at least about 1.5:1, such as at least about 2:1, at least about 4:1, or even at least about 5:1. Still, in other instances, the abrasive particle can be formed such that the body has a primary aspect ratio that is not greater than about 10:1, such as not greater than 9:1, not greater than about 8:1, or even not greater than about 5:1. It will be appreciated that the body 301 can have a primary aspect ratio within a range between any of the ratios noted above. Furthermore, it will be appreciated that reference herein to a height is the maximum height measurable of the abrasive particle. It will be described later that the abrasive particle may have different heights at different positions within the body 101 of the abrasive particle 100.

In addition to the primary aspect ratio, the abrasive particle can be formed such that the body 301 comprises a secondary aspect ratio, which can be defined as a ratio of length:height, wherein the height is an interior median height (Mhi). In certain instances, the secondary aspect ratio can be within a range between about 5:1 and about 1:3, such as between about 4:1 and about 1:2, or even between about 3:1 and about 1:2.

In accordance with another embodiment, the abrasive particle can be formed such that the body 301 comprises a tertiary aspect ratio, defined by the ratio width:height, wherein the height is an interior median height (Mhi). The tertiary aspect ratio of the body 101 can be within a range between about 10:1 and about 1.5:1, such as between 8:1 and about 1.5:1, such as between about 6:1 and about 1.5:1, or even between about 4:1 and about 1.5:1.

According to one embodiment, the body 301 of the shaped abrasive particle can have particular dimensions, which may facilitate improved performance. For example, in one instance, the body can have an interior height (hi), which can be the smallest dimension of height of the body as measured along a dimension between any corner and opposite midpoint edge on the body. In particular instances wherein the body is a generally triangular two-dimensional shape, the interior height (hi) may be the smallest dimension of height (i.e., measure between the bottom surface 304 and the upper surface 305) of the body for three measurements taken between each of the three corners and the opposite midpoint edges. The interior height (hi) of the body of a shaped abrasive particle is illustrated in FIG. 3B. According to one embodiment, the interior height (hi) can be at least about 28% of the width (w). The height (hi) of any particle may be measured by sectioning or mounting and grinding the shaped abrasive particle and viewing in a manner sufficient (e.g., light microscope or SEM) to determine the smallest height (hi) within the interior of the body 301. In one particular embodiment, the height (hi) can be at least about 29% of the width, such as at least about 30%, or even at least about 33% of the width of the body. For one non-limiting embodiment, the height (hi) of the body can be not greater than about 80% of the width, such as not greater than about 76%, not greater than about 73%, not greater than about 70%, not greater than about 68% of the width, not greater than about 56% of the width, not greater than about 48% of the width, or even not greater than about 40% of the width. It will be appreciated that the height (hi) of the body can be within a range between any of the above noted minimum and maximum percentages.

A batch of shaped abrasive particles, can be fabricated, wherein the median interior height value (Mhi) can be controlled, which may facilitate improved performance. In particular, the median internal height (hi) of a batch can be related to a median width of the shaped abrasive particles of the batch in the same manner as described above. Notably, the median interior height (Mhi) can be at least about 28%, such as at least about 29%, at least about 30%, or even at least about 33% of the median width of the shaped abrasive particles of the batch. For one non-limiting embodiment, the median interior height (Mhi) of the body can be not greater than about 80%, such as not greater than about 76%, not greater than about 73%, not greater than about 70%, not greater than about 68% of the width, not greater than about 56% of the width, not greater than about 48% of the width, or even not greater than about 40% of the median width. It will be appreciated that the median interior height (Mhi) of the body can be within a range between any of the above noted minimum and maximum percentages.

Furthermore, the batch of shaped abrasive particles may exhibit improved dimensional uniformity as measured by the standard deviation of a dimensional characteristic from a suitable sample size. According to one embodiment, the shaped abrasive particles can have an interior height variation (Vhi), which can be calculated as the standard deviation of interior height (hi) for a suitable sample size of particles from a batch. According to one embodiment, the interior height variation can be not greater than about 60 microns, such as not greater than about 58 microns, not greater than about 56 microns, or even not greater than about 54 microns. In one non-limiting embodiment, the interior height variation (Vhi) can be at least about 2 microns. It will be appreciated that the interior height variation of the body can be within a range between any of the above noted minimum and maximum values.

For another embodiment, the body of the shaped abrasive particle can have an interior height (hi) of at least about 400 microns. More particularly, the height may be at least about 450 microns, such as at least about 475 microns, or even at least about 500 microns. In still one non-limiting embodiment, the height of the body can be not greater than about 3 mm, such as not greater than about 2 mm, not greater than about 1.5 mm, not greater than about 1 mm, not greater than about 800 microns. It will be appreciated that the height of the body can be within a range between any of the above noted minimum and maximum values. Moreover, it will be appreciated that the above range of values can be representative of a median interior height (Mhi) value for a batch of shaped abrasive particles.

For certain embodiments herein, the body of the shaped abrasive particle can have particular dimensions, including for example, a width≥length, a length≥height, and a width-≥height. More particularly, the body of the shaped abrasive particle can have a width (w) of at least about 600 microns, such as at least about 700 microns, at least about 800 microns, or even at least about 900 microns. In one non-limiting instance, the body can have a width of not greater than about 4 mm, such as not greater than about 3 mm, not greater than about 2.5 mm, or even not greater than about 2 mm. It will be appreciated that the width of the body can be within a range between any of the above noted minimum and maximum values. Moreover, it will be appreciated that the above range of values can be representative of a median width (Mw) for a batch of shaped abrasive particles.

The body of the shaped abrasive particle can have particular dimensions, including for example, a length (L middle or Lp) of at least about 0.4 mm, such as at least about 0.6 mm, at least about 0.8 mm, or even at least about 0.9 mm. Still, for at least one non-limiting embodiment, the body can have a length of not greater than about 4 mm, such as not greater than about 3 mm, not greater than about 2.5 mm, or even not greater than about 2 mm. It will be appreciated that the length of the body can be within a range between any of the above noted minimum and maximum values. Moreover, it will be appreciated that the above range of values can be representative of a median length (Ml), which may be more particularly, a median middle length (MLmiddle) or median profile length (MLp) for a batch of shaped abrasive particles.

The shaped abrasive particle can have a body having a particular amount of dishing, wherein the dishing value (d) can be defined as a ratio between an average height of the body at the corners (Ahc) as compared to smallest dimension of height of the body at the interior (hi). The average height of the body at the corners (Ahc) can be calculated by measuring the height of the body at all corners and averaging the values, and may be distinct from a single value of height at one corner (hc). The average height of the body at the corners or at the interior can be measured using a STIL (Sciences et Techniques Industrielles de la Lumiere-France) Micro Measure 3D Surface Profilometer (white light (LED) chromatic aberration technique). Alternatively, the dishing may be based upon a median height of the particles at the corner (Mhc) calculated from a suitable sampling of particles from a batch. Likewise, the interior height (hi) can be a median interior height (Mhi) derived from a suitable sampling of shaped abrasive particles from a batch. According to one embodiment, the dishing value (d) can be not greater than about 2, such as not greater than about 1.9, not greater than about 1.8, not greater than about 1.7, not greater than about 1.6, or even not greater than about 1.5. Still, in at least one non-limiting embodiment, the dishing value (d) can be at least about 0.9, such as at least about 1.0. It will be appreciated that the dishing ratio can be within a range between any of the minimum and maximum values noted above. Moreover, it will be appreciated that the above dishing values can be representative of a median dishing value (Md) for a batch of shaped abrasive particles.

The shaped abrasive particles of the embodiments herein, including for example, the body 301 of the particle of FIG. 3A can have a bottom surface 304 defining a bottom area ($A_b$). In particular instances the bottom surface 304 can be the largest surface of the body 301. The bottom surface can have a surface area defined as the bottom area ($A_b$) that is greater than the surface area of the upper surface 303. Additionally, the body 301 can have a cross-sectional midpoint area ($A_m$) defining an area of a plane perpendicular to the bottom area and extending through a midpoint 381 of the particle. In certain instances, the body 301 can have an area ratio of bottom area to midpoint area ($A_b/A_m$) of not greater than about 6. In more particular instances, the area ratio can be not greater than about 5.5, such as not greater than about 5, not greater than about 4.5, not greater than about 4, not greater than about 3.5, or even not greater than about 3. Still, in one non-limiting embodiment, the area ratio may be at least about 1.1, such as at least about 1.3, or even at least about 1.8. It will be appreciated that the area ratio can be within a range between any of the minimum and maximum values noted above. Moreover, it will be appreciated that the above area ratios can be representative of a median area ratio for a batch of shaped abrasive particles.

Furthermore the shaped abrasive particles of the embodiments herein, including for example, the particle of FIG. 3B can have a normalized height difference of at least about 0.3. The normalized height difference can be defined by the absolute value of the equation [(hc−hm)/(hi)]. In other embodiments, the normalized height difference can be not greater than about 0.26, such as not greater than about 0.22, or even not greater than about 0.19. Still, in one particular embodiment, the normalized height difference can be at least about 0.04, such as at least about 0.05, at least about 0.06. It will be appreciated that the normalized height difference can be within a range between any of the minimum and maximum values noted above. Moreover, it will be appreciated that the above normalized height values can be representative of a median normalized height value for a batch of shaped abrasive particles.

In another instance, the body can have a profile ratio of at least about 0.04, wherein the profile ratio is defined as a ratio of the average difference in height [hc−hm] to the length (Lmiddle) of the shaped abrasive particle, defined as the absolute value of [(hc−hm)/(Lmiddle)]. It will be appreciated that the length (Lmiddle) of the body can be the distance across the body 301 as illustrated in FIG. 3B. Moreover, the length may be an average or median length calculated from a suitable sampling of particles from a batch of shaped abrasive particles as defined herein. According to a particular embodiment, the profile ratio can be at least about 0.05, at least about 0.06, at least about 0.07, at least about 0.08, or even at least about 0.09. Still, in one non-limiting embodiment, the profile ratio can be not greater than about 0.3, such as not greater than about 0.2, not greater than about 0.18, not greater than about 0.16, or even not greater than about 0.14. It will be appreciated that the profile ratio can be within a range between any of the minimum and maximum values noted above. Moreover, it will be appreciated that the above profile ratio can be representative of a median profile ratio for a batch of shaped abrasive particles.

According to another embodiment, the body can have a particular rake angle, which may be defined as an angle between the bottom surface 304 and a side surface 305, 306 or 307 of the body. For example, the rake angle may be within a range between about 1° and about 80°. For other particles herein, the rake angle can be within a range between about 5° and 55°, such as between about 10° and about 50°, between about 15° and 50°, or even between about 20° and 50°. Formation of an abrasive particle having such a rake angle can improve the abrading capabilities of the abrasive particle 100. Notably, the rake angle can be within a range between any two rake angles noted above.

According to another embodiment, the shaped abrasive particles herein, including for example the particles of FIGS. 3A and 3B can have an ellipsoidal region 317 in the upper surface 303 of the body 301. The ellipsoidal region 317 can be defined by a trench region 318 that can extend around the upper surface 303 and define the ellipsoidal region 317. The ellipsoidal region 317 can encompass the midpoint 381. Moreover, it is thought that the ellipsoidal region 317 defined in the upper surface can be an artifact of the forming process, and may be formed as a result of the stresses imposed on the mixture during formation of the shaped abrasive particles according to the methods described herein.

Figure 4:
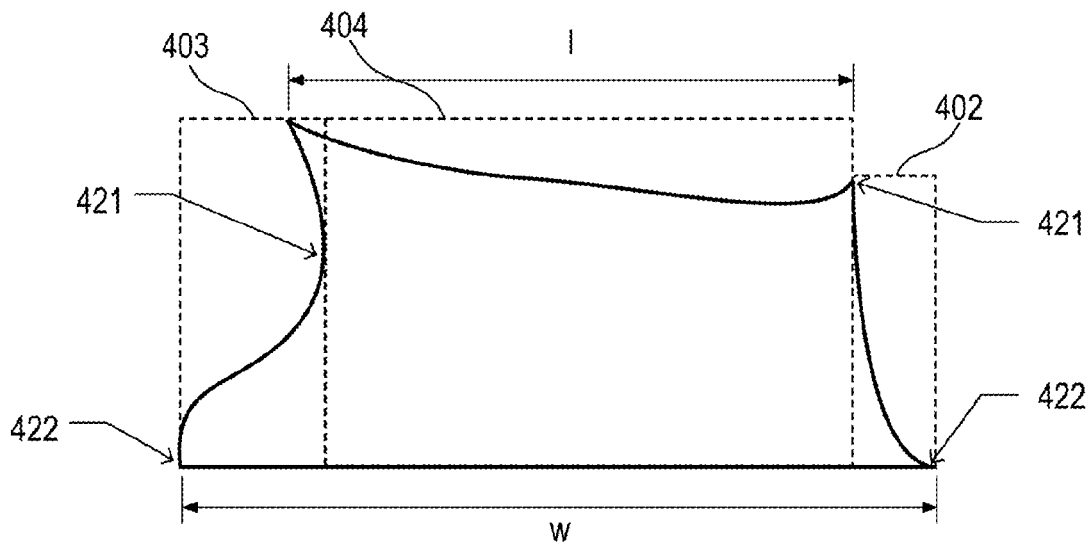
FIG. 4 includes a side view of a shaped abrasive particle according to an embodiment.

In one aspect, the body can include a shaped abrasive particle having a percent flashing that may facilitate improved performance. Notably, the flashing defines an area of the particle as viewed along one side, such as illustrated in FIG. 4, wherein the flashing can extend from a side surface of the body within the boxes 402 and 403. The flashing can represent tapered regions proximate to the upper surface and bottom surface of the body. The flashing can be measured as the percentage of area of the body along the side surface contained within a box extending between an innermost point of the side surface (e.g., 421) and an outermost point (e.g., 422) on the side surface of the body. In one particular instance, the body can have a particular content of flashing, which can be the percentage of area of the body contained within the boxes 402 and 403 compared to the total area of the body contained within boxes 402, 403, and 404. According to one embodiment, the percent flashing (f) of the body can be at least about 10%. In another embodiment, the percent flashing can be greater, such as at least about 12%, such as at least about 14%, at least about 16%, at least about 18%, or even at least about 20%. Still, in a non-limiting embodiment, the percent flashing of the body can be not greater than about 45%, such as not greater than about 40%, or even not greater than about 36%. It will be appreciated that the percent flashing of the body can be within a range between any of the above minimum and maximum percentages. Moreover, it will be appreciated that the above flashing percentages can be representative of an average flashing percentage or a median flashing percentage for a batch of shaped abrasive particles.

The percent flashing can be measured by mounting the shaped abrasive particle on its side and viewing the body at the side to generate a black and white image, such as illustrated in FIG. 4. A suitable program for such includes ImageJ software. The percentage flashing can be calculated by determining the area of the body 401 in the boxes 402 and 403 compared to the total area of the body as viewed at the side (total shaded area), including the area in the center 404 and within the boxes. Such a procedure can be completed for a suitable sampling of particles to generate average, median, and/or and standard deviation values.

A batch of particulate material including shaped abrasive particles according to embodiments herein may exhibit improved dimensional uniformity as measured by the standard deviation of a dimensional characteristic from a suitable sample size. According to one embodiment, the shaped abrasive particles can have a flashing variation (Vf), which can be calculated as the standard deviation of flashing percentage (f) for a suitable sample size of particles from a batch. According to one embodiment, the flashing variation can be not greater than about 5.5%, such as not greater than about 5.3%, not greater than about 5%, or not greater than about 4.8%, not greater than about 4.6%, or even not greater than about 4.4%. In one non-limiting embodiment, the flashing variation (Vf) can be at least about 0.1%. It will be appreciated that the flashing variation can be within a range between any of the minimum and maximum percentages noted above.

The particulate material including shaped abrasive particles of the embodiments herein can have a height (hi) and flashing multiplier value (hiF) of at least 4000, wherein hiF=(hi)(f), an "hi" represents a minimum interior height of the body as described above and "f" represents the percent flashing. In one particular instance, the height and flashing multiplier value (hiF) of the body can be greater, such as at least about 4500 micron %, at least about 5000 micron %, at least about 6000 micron %, at least about 7000 micron %, or even at least about 8000 micron %. Still, in one non-limiting embodiment, the height and flashing multiplier value can be not greater than about 45000 micron %, such as not greater than about 30000 micron %, not greater than about 25000 micron %, not greater than about 20000 micron %, or even not greater than about 18000 micron %. It will be appreciated that the height and flashing multiplier value of the body can be within a range between any of the above minimum and maximum values. Moreover, it will be appreciated that the above multiplier value can be representative of a median multiplier value (MhiF) for a batch of shaped abrasive particles.

The particulate material including shaped abrasive particles of the embodiments herein can have a dishing (d) and flashing (F) multiplier value (dF) as calculated by the equation dF=(d)(F), wherein dF is not greater than about 90%, "d" represents the dishing value, and "f" represents the percentage flashing of the body. In one particular instance, the dishing (d) and flashing (F) multiplier value (dF) of the body can be not greater than about 70%, such as not greater than about 60%, not greater than about 55%, not greater than about 48%, not greater than about 46%. Still, in one non-limiting embodiment, the dishing (d) and flashing (F) multiplier value (dF) can be at least about 10%, such as at least about 15%, at least about 20%, at least about 22%, at least about 24%, or even at least about 26%. It will be appreciated that the dishing (d) and flashing (F) multiplier value (dF) of the body can be within a range between any of the above minimum and maximum values. Moreover, it will be appreciated that the above multiplier value can be representative of a median multiplier value (MdF) for a batch of shaped abrasive particles.

The particulate material including shaped abrasive particles of the embodiments herein can have a height and dishing ratio (hi/d) as calculated by the equation hi/d=(hi)/(d), wherein hi/d is not greater than about 1000, "hi" represents a minimum interior height as described above, and "d" represents the dishing of the body. In one particular instance, the ratio (hi/d) of the body can be not greater than about 900 microns, not greater than about 800 microns, not greater than about 700 microns, or even not greater than about 650 microns. Still, in one non-limiting embodiment, the ratio (hi/d), can be at least about 10 microns, such as at least about 50 microns, at least about 100 microns, at least about 150 microns, at least about 200 microns, at least about 250 microns, or even at least about 275 microns. It will be appreciated that the ratio (hi/d) of the body can be within a range between any of the above minimum and maximum values. Moreover, it will be appreciated that the above height and dishing ratio can be representative of a median height and dishing ratio (Mhi/d) for a batch of shaped abrasive particles.

The particulate material can be formed such that the body includes a crystalline material, and more particularly, a polycrystalline material. Notably, the polycrystalline material can include abrasive grains. In one embodiment, the body can be essentially free of an organic material, including for example, a binder. More particularly, the body can consist essentially of a polycrystalline material.

As noted herein, the particulate material can be an abrasive material. As such, the particulate material may be deployed in various manners for use in abrasive articles. For example, the particulate material may be part of a fixed abrasive article such as a coated abrasive article, bonded abrasive article, and a combination thereof. In particular instances, the particulate material can be coupled to a bond material, and further coupled to a backing or substrate via the bond material. The bond material may include compositions such as vitrified materials, ceramic materials, metal alloy, organic material, a resin, a polymer, and a combination thereof. In at least one instance, the particulate material can be part of a coated abrasive forming a single layer of abrasive particles coupled to a backing.

Figure 5:
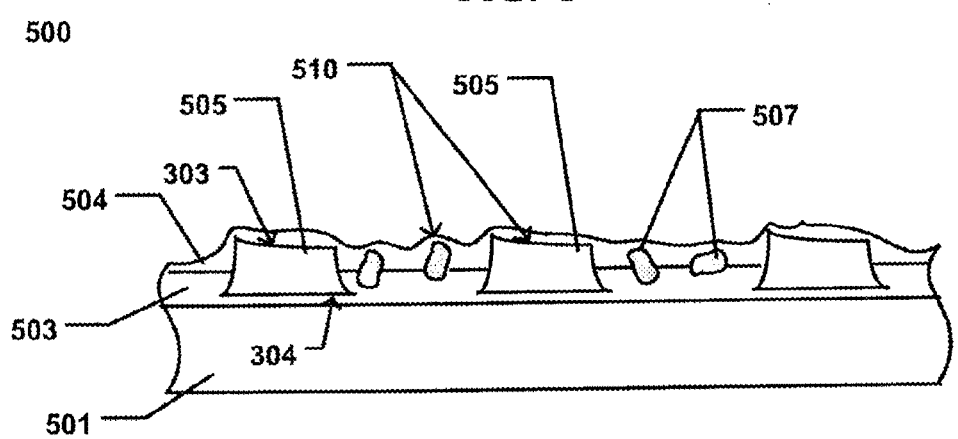
FIG. 5 includes an abrasive article including particulate material according to an embodiment.

FIG. 5 includes an illustration of a portion of an abrasive article including particulate material in accordance with an embodiment. In particular, the abrasive article of FIG. 5 includes a coated abrasive 500 having a substrate 501 and at least one adhesive layer overlying a surface of the substrate 501. The adhesive layer can include one or more layers of material, including for example, a make coat 503 and/or a size coat 504. The coated abrasive 500 can include abrasive particulate material 510, which can include shaped abrasive particles 505 of the embodiments herein and a second type of abrasive particulate material 507 in the form of diluent abrasive particles having a random shape, which may not necessarily be shaped abrasive particles. The abrasive particulate material 507 can also be representative of the particulate material of the embodiments herein, including any combination of features of the embodiments herein. The make coat 503 can be overlying the surface of the substrate 501 and surrounding at least a portion of the shaped abrasive particles 505 and second type of abrasive particulate material 507. The size coat 504 can be overlying and bonded to the shaped abrasive particles 505 and second type of abrasive particulate material 507 and the make coat 503.

According to one embodiment, the substrate 501 can include an organic material, inorganic material, and a combination thereof. In certain instances, the substrate 501 can include a woven material. However, the substrate 501 may be made of a non-woven material. Particularly suitable substrate materials can include organic materials, including polymers, and particularly, polyester, polyurethane, polypropylene, polyimides such as KAPTON from DuPont, paper. Some suitable inorganic materials can include metals, metal alloys, and particularly, foils of copper, aluminum, steel, and a combination thereof.

A polymer formulation may be used to form any of a variety of layers of the abrasive article such as, for example, the frontfill, the pre-size coat, the make coat, the size coat, and/or the supersize coat. When used to form the frontfill, the polymer formulation may generally include a polymer resin, fibrillated fibers (preferably in the form of pulp), filler material, and other optional additives. Suitable formulations for some frontfill embodiments can include material such as a phenolic resin, wollastonite filler, defoamer, surfactant, a fibrillated fiber, and a balance of water. Suitable polymeric resin materials include curable resins selected from thermally curable resins including phenolic resins, urea/formaldehyde resins, phenolic/latex resins, as well as combinations of such resins. Other suitable polymeric resin materials may also include radiation curable resins, such as those resins curable using electron beam, UV radiation, or visible light, such as epoxy resins, acrylated oligomers of acrylated epoxy resins, polyester resins, acrylated urethanes and polyester acrylates and acrylated monomers including monoacrylated, multiacrylated monomers. The formulation can also comprise a non-reactive thermoplastic resin binder which can enhance the self-sharpening characteristics of the deposited abrasive composites by enhancing the erodability. Examples of such thermoplastic resin include polypropylene glycol, polyethylene glycol, and polyoxypropylene-polyoxyethene block copolymer, etc. Use of a frontfill on the backing can improve the uniformity of the surface, for suitable application of the make coat and improved application and orientation of shaped abrasive particles in a predetermined orientation.

The make coat 503 can be applied to the surface of the substrate 501 in a single process, or alternatively, the abrasive particulate material 510 can be combined with a make coat 503 material and applied as a mixture to the surface of the substrate 501. Suitable materials of the make coat 503 can include organic materials, particularly polymeric materials, including for example, polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. In one embodiment, the make coat 503 can include a polyester resin. The coated substrate can then be heated in order to cure the resin and the abrasive particulate material to the substrate. In general, the coated substrate 501 can be heated to a temperature of between about 100° C. to less than about 250° C. during this curing process.

The abrasive particulate material 510 can include shaped abrasive particles according to embodiments herein. In particular instances, the abrasive particulate material 510 may include different types of shaped abrasive particles. The different types of shaped abrasive particles can differ from each other in composition, two-dimensional shape, three-dimensional shape, size, and a combination thereof as described in the embodiments herein. As illustrated, the coated abrasive 500 can include a shaped abrasive particle 505 having a generally triangular two-dimensional shape.

The other type of abrasive particles 507 can be diluent particles different than the shaped abrasive particles 505. For example, the diluent particles can differ from the shaped abrasive particles 505 in composition, two-dimensional shape, three-dimensional shape, size, and a combination thereof. For example, the abrasive particles 507 can represent conventional, crushed abrasive grit having random shapes. The abrasive particles 507 may have a median particle size less than the median particle size of the shaped abrasive particles 505.

After sufficiently forming the make coat 503 with the abrasive particulate material 510, the size coat 504 can be formed to overlie and bond the abrasive particulate material 510 in place. The size coat 504 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

Figure 6:
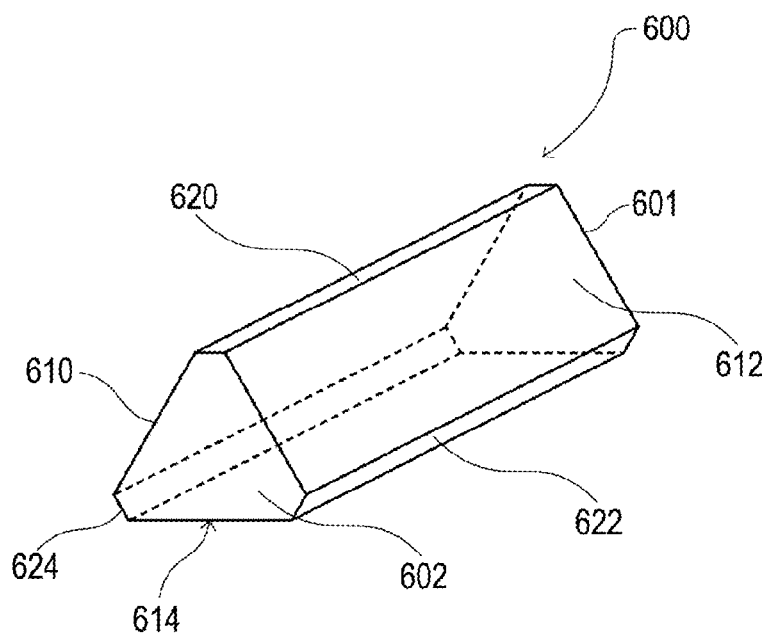
FIGS. 6-11 include exemplary particulate materials defining shaped abrasive particles according to an embodiment.

FIGS. 6-11 include exemplary abrasive particulate material having specific contours and defining shaped abrasive particles, which can incorporate the compositions described herein. As shown in FIG. 6, the shaped abrasive particle 600 may include a body 601 that is generally prismatic with a first end face 602 and a second end face 604. Further, the shaped abrasive particle 600 may include a first side face 610 extending between the first end face 602 and the second end face 604. A second side face 612 may extend between the first end face 602 and the second end face 604 adjacent to the first side face 610. As shown, the shaped abrasive particle 600 may also include a third side face 614 extending between the first end face 602 and the second end face 604 adjacent to the second side face 612 and the first side face 610.

As depicted in FIG. 6, the shaped abrasive particle 600 may also include a first edge 620 between the first side face 610 and the second side face 612. The shaped abrasive particle 600 may also include a second edge 622 between the second side face 612 and the third side face 614. Further, the shaped abrasive particle 600 may include a third edge 624 between the third side face 614 and the first side face 612.

As shown, each end face 602, 604 of the shaped abrasive particle 600 may be generally triangular in shape, or may be a truncated triangular shape. Each side face 610, 612, 614 may be generally rectangular in shape. Further, the cross section of the shaped abrasive particle 600 in a plane parallel to the end faces 602, 604 can be generally triangular. It will be appreciated that while the cross-sectional shape of the shaped abrasive particle 600 through a plane parallel to the end faces 602, 604 is illustrated as being generally triangular, other shapes are possible, including any polygonal shapes, for example a quadrilateral, a pentagon, a hexagon, a heptagon, an octagon, a nonagon, a decagon, etc. Further, the cross-sectional shape of the shaped abrasive particle may be convex, non-convex, concave, or non-concave. While the particle is illustrated as having a prismatic shape, it will be appreciated that the shape may be altered, such that it is a thin body having generally triangular end faces 602 and 604 and a dimension of thickness extending between the end faces 602 and 604, which can be the smallest dimension of the particle.

Figure 7:
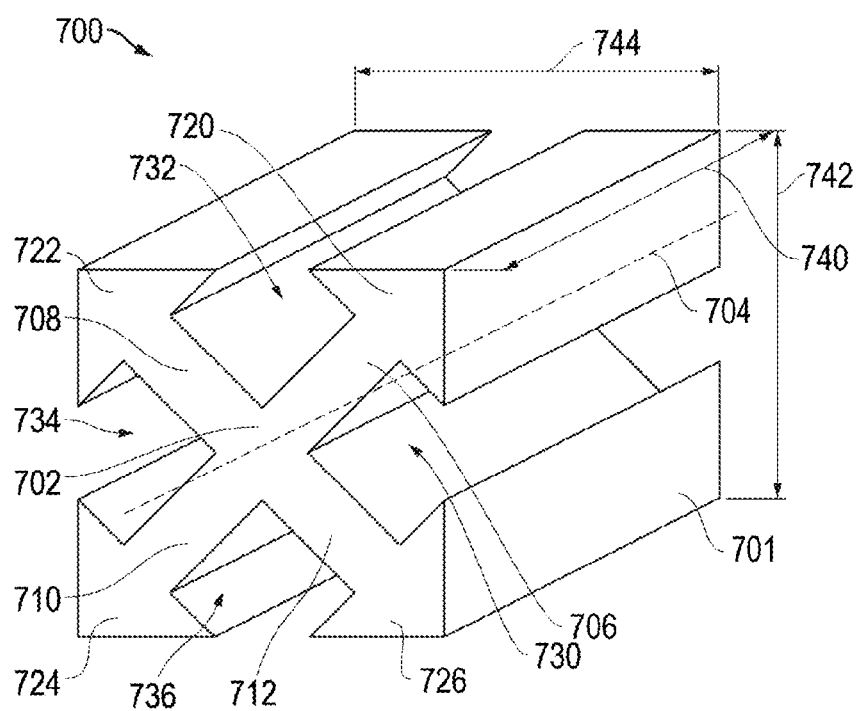

FIG. 7 includes an illustration of a shaped abrasive particle according to another embodiment. As depicted, the shaped abrasive particle 700 may include a body 701 that may include a central portion 702 that extends along a longitudinal axis 704. A first radial arm 706 may extend outwardly from the central portion 702 along the length of the central portion 702. A second radial arm 708 may extend outwardly from the central portion 702 along the length of the central portion 702. A third radial arm 710 may extend outwardly from the central portion 702 along the length of the central portion 702. Moreover, a fourth radial arm 712 may extend outwardly from the central portion 702 along the length of the central portion 702. The radial arms 706, 708, 710, 712 may be equally spaced around the central portion 702 of the shaped abrasive particle 700.

As shown in FIG. 7, the first radial arm 706 may include a generally arrow shaped distal end 720. The second radial arm 708 may include a generally arrow shaped distal end 722. The third radial arm 710 may include a generally arrow shaped distal end 724. Further, the fourth radial arm 712 may include a generally arrow shaped distal end 726.

FIG. 7 also indicates that the shaped abrasive particle 700 may be formed with a first void 730 between the first radial arm 706 and the second radial arm 708. A second void 732 may be formed between the second radial arm 708 and the third radial arm 710. A third void 734 may also be formed between the third radial arm 710 and the fourth radial arm 712. Additionally, a fourth void 736 may be formed between the fourth radial arm 712 and the first radial arm 706.

As shown in FIG. 7, the shaped abrasive particle 700 may include a length 740, a height 742, and a width 744. In a particular aspect, the length 740 is greater than the height 742 and the height 742 is greater than the width 744. In a particular aspect, the shaped abrasive particle 700 may define a primary aspect ratio that is the ratio of the length 740 to the height 742 (length:width). Further, the shaped abrasive particle 700 may define a secondary aspect ratio that is the ratio of the height 742 to the width 744 (width:height). Finally, the shaped abrasive particle 700 may define a tertiary aspect ratio that is the ratio of the length 740 to the width 742 (length:height).

According to one embodiment, the shaped abrasive particles can have a primary aspect ratio of at least about 1:1, such as at least about 1.1:1, at least about 1.5:1, at least about 2:1, at least about 2.5:1, at least about 3:1, at least about 3.5:1, at least 4:1, at least about 4.5:1, at least about 5:1, at least about 6:1, at least about 7:1, at least about 8:1, or even at least about 10:1.

In another instance, the shaped abrasive particle can be formed such that the body has a secondary aspect ratio of at least about 0.5:1, such as at least about 0.8:1, at least about 1:1, at least about 1.5:1, at least about 2:1, at least about 2.5:1, at least about 3:1, at least about 3.5:1, at least 4:1, at least about 4.5:1, at least about 5:1, at least about 6:1, at least about 7:1, at least about 8:1, or even at least about 10:1.

Furthermore, certain shaped abrasive particles can have a tertiary aspect ratio of at least about 1:1, such as at least about 1.5:1, at least about 2:1, at least about 2.5:1, at least about 3:1, at least about 3.5:1, at least 4:1, at least about 4.5:1, at least about 5:1, at least about 6:1, at least about 7:1, at least about 8:1, or even at least about 10:1.

Certain embodiments of the shaped abrasive particle 700 can have a shape with respect to the primary aspect ratio that is generally rectangular, e.g., flat or curved. The shape of the shaped abrasive particle 700 with respect to the secondary aspect ratio may be any polyhedral shape, e.g., a triangle, a square, a rectangle, a pentagon, etc. The shape of the shaped abrasive particle 700 with respect to the secondary aspect ratio may also be the shape of any alphanumeric character, e.g., 1, 2, 3, etc., A, B, C. etc. Further, the contour of the shaped abrasive particle 700 with respect to the secondary aspect ratio may be a character selected from the Greek alphabet, the modern Latin alphabet, the ancient Latin alphabet, the Russian alphabet, any other alphabet, or any combination thereof. Further, the shape of the shaped abrasive particle 700 with respect to the secondary aspect ratio may be a Kanji character.

Figure 8:
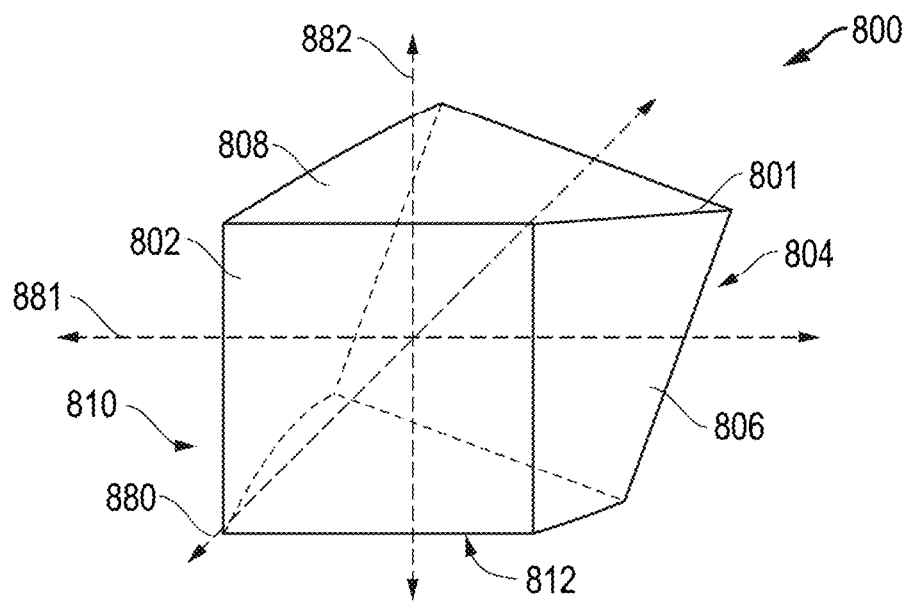
Figure 9:
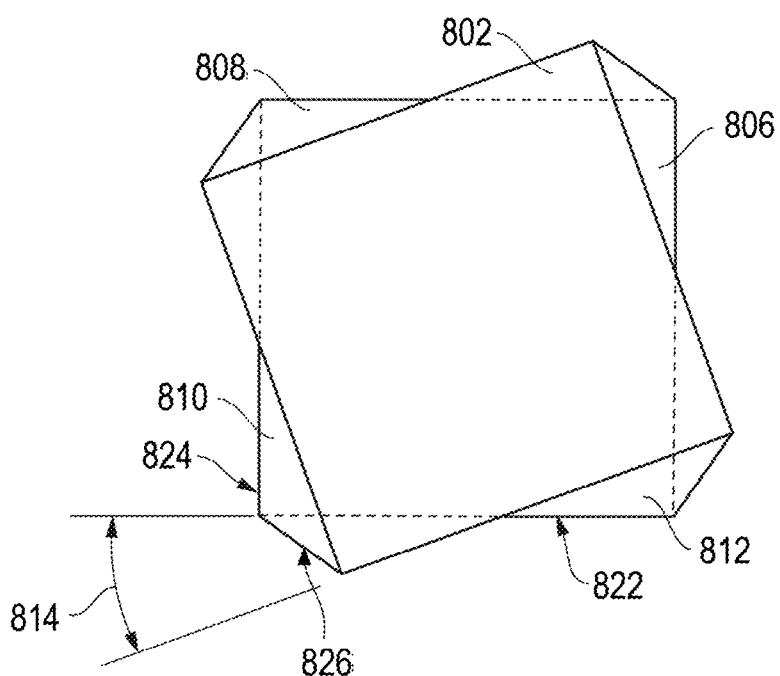

FIGS. 8-9 depict another embodiment of a shaped abrasive particle that is generally designated 800. As shown, the shaped abrasive particle 800 may include a body 801 that has a generally cube-like shape. It will be appreciated that the shaped abrasive particle may be formed to have other polyhedral shapes. The body 801 may have a first end face 802 and a second end face 804, a first lateral face 806 extending between the first end face 802 and the second end face 804, a second lateral face 808 extending between the first end face 802 and the second end face 804. Further, the body 801 can have a third lateral face 810 extending between the first end face 802 and the second end face 804, and a fourth lateral face 812 extending between the first end face 802 and the second end face 804.

As shown, the first end face 802 and the second end face 804 can be parallel to each other and separated by the lateral faces 806, 808, 810, and 812, giving the body a cube-like structure. However, in a particular aspect, the first end face 802 can be rotated with respect to the second end face 804 to establish a twist angle 814. The twist of the body 801 can be along one or more axes and define particular types of twist angles. For example, as illustrated in a top-down view of the body in FIG. 9 looking down the longitudinal axis 880 defining a length of the body 801 on the end face 802 parallel to a plane defined by the lateral axis 881 extending along a dimension of width of the body 801 and the vertical axis 882 extending along a dimension of height of the body 801. According to one embodiment, the body 801 can have a longitudinal twist angle 814 defining a twist in the body 801 about the longitudinal axis such that the end faces 682 and 804 are rotated relative to each other. The twist angle 814, as illustrated in FIG. 9 can be measured as the angle between a tangent of a first edge 822 and a second edge 824, wherein the first edge 822 and second edge 824 are joined by and share a common edge 826 extending longitudinally between two of the lateral faces (810 and 812). It will be appreciated that other shaped abrasive particles can be formed to have twist angles relative to the lateral axis, the vertical axis, and a combination thereof. Any of such twist angles can have a value as described herein.

In a particular aspect, the twist angle 814 is at least about 1°. In other instances, the twist angle can be greater, such as at least about 2°, at least about 5°, at least about 8°, at least about 10°, at least about 12°, at least about 15°, at least about 18°, at least about 20°, at least about 25°, at least about 30°, at least about 40°, at least about 50°, at least about 60°, at least about 70°, at least about 80°, or even at least about 90°. Still, according to certain embodiments, the twist angle 814 can be not greater than about 360°, such as not greater than about 330°, such as not greater than about 300°, not greater than about 270°, not greater than about 230°, not greater than about 200°, or even not greater than about 180°. It will be appreciated that certain shaped abrasive particles can have a twist angle within a range between any of the minimum and maximum angles noted above.

Further, the body may include an opening that extends through the entire interior of the body along one of the longitudinal axis, lateral axis, or vertical axis.

Figure 10:
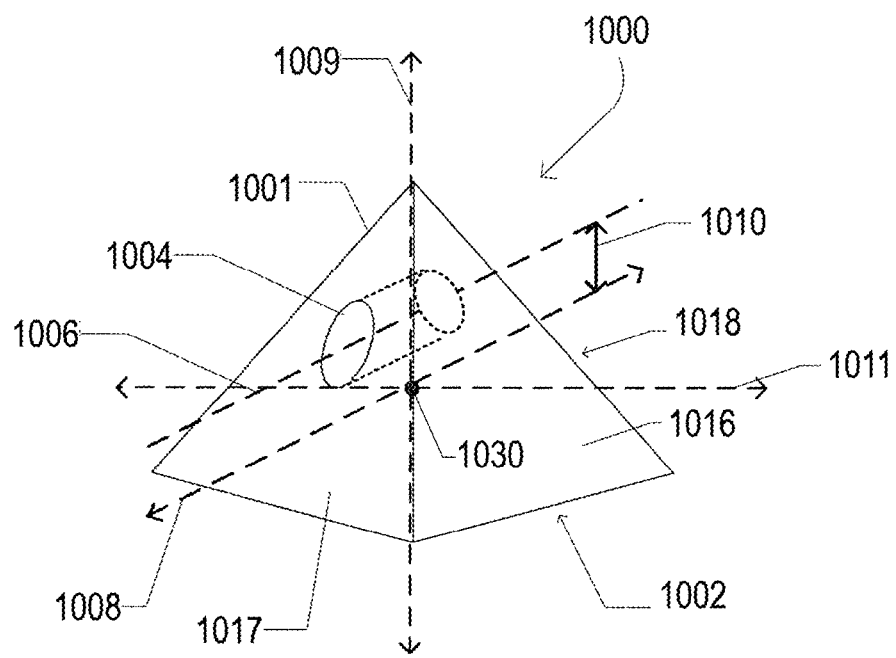

FIG. 10 includes an illustration of another embodiment of a shaped abrasive particle. As shown, the shaped abrasive particle 1000 may include a body 1001 having a generally pyramid shape with a generally triangle shaped bottom face 1002. The body can further include sides 1016, 1017, and 1018 connected to each other and the bottom face 1002. It will be appreciated that while the body 1001 is illustrated as having a pyramidal polyhedral shape, other shapes are possible, as described herein/

According to one embodiment, the shaped abrasive particle 1000 may be formed with a hole 1004 (i.e., and opening) that can extend through at least a portion of the body 1001, and more particularly may extend through an entire volume of the body 1001. In a particular aspect, the hole 1004 may define a central axis 1006 that passes through a center of the hole 1004. Further, the shaped abrasive particle 1000 may also define a central axis 1008 that passes through a center 1030 of the shaped abrasive particle 1000. It may be appreciated that the hole 1004 may be formed in the shaped abrasive particle 1000 such that the central axis 1006 of the hole 1004 is spaced apart from the central axis 1008 by a distance 1010. As such, a center of mass of the shaped abrasive particle 1000 may be moved below the geometric midpoint 1030 of the shaped abrasive particle 1000, wherein the geometric midpoint 1030 can be defined by the intersection of a longitudinal axis 1009, lateral axis 1011, and the central axis (i.e., lateral axis) 1008. Moving the center of mass below the geometric midpoint 1030 of the shaped abrasive grain can increase the likelihood that the shaped abrasive particle 1000 lands on the same face, e.g., the bottom face 1002, when dropped, or otherwise deposited, onto a backing, such that the shaped abrasive particle 1000 has a predetermined, upright orientation.

In a particular embodiment, the center of mass is displaced from the geometric midpoint 1030 by a distance that can be at least about 0.05 the height (h) along a longitudinal axis 1009 of the body 1002 defining a height. In another embodiment, the center of mass may be displaced from the geometric midpoint 1030 by a distance of at least about 0.1(h), such as at least about 0.15(h), at least about 0.18(h), at least about 0.2(h), at least about 0.22(h), at least about 0.25(h), at least about 0.27(h), at least about 0.3(h), at least about 0.32(h), at least about 0.35(h), or even at least about 0.38(h). Still, the center of mass of the body 1001 may be displaced a distance from the geometric midpoint 1030 of no greater than 0.5(h), such as no greater than 0.49 (h), no greater than 0.48(h), no greater than 0.45(h), no greater than 0.43(h), no greater than 0.40(h), no greater than 0.39(h), or even no greater than 0.38(h). It will be appreciated that the displacement between the center of mass and the geometric midpoint can be within a range between any of the minimum and maximum values noted above.

In particular instances, the center of mass may be displaced from the geometric midpoint 1030 such that the center of mass is closer to a base, e.g., the bottom face 1002, of the body 1001, than a top of the body 1001 when the shaped abrasive particle 1000 is in an upright orientation as shown in FIG. 10.

In another embodiment, the center of mass may be displaced from the geometric midpoint 1030 by a distance that is at least about 0.05 the width (w) along a lateral axis 1008 of the of the body 1001 defining the width. In another aspect, the center of mass may be displaced from the geometric midpoint 1030 by a distance of at least about 0.1(w), such as at least about 0.15(w), at least about 0.18(w), at least about 0.2(w), at least about 0.22(w), at least about 0.25(w), at least about 0.27(w), at least about 0.3(w), or even at least about 0.35(w). Still, in one embodiment, the center of mass may be displaced a distance from the geometric midpoint 1030 no greater than 0.5(w), such as no greater than 0.49 (w), no greater than 0.45(w), no greater than 0.43(w), no greater than 0.40(w), or even no greater than 0.38(w). It will be appreciated that the center of mass can be displaced a distance from the geometric midpoint along the lateral axis within a range between any of the minimum and maximum values noted above.

In another embodiment, the center of mass may be displaced from the geometric midpoint 1030 along the longitudinal axis 1009 by a distance (Dl) of at least about 0.05 the length (l) of the body 1001. According to a particular embodiment, the center of mass may be displaced from the geometric midpoint by a distance of at least about 0.1(l), such as at least about 0.15(l), at least about 0.18(l), at least about 0.2(l), at least about 0.25(l), at least about 0.3(l), at least about 0.35(l), or even at least about 0.38(l). Still, for certain abrasive particles, the center of mass can be displaced a distance no greater than about 0.5(l), such as no greater than about 0.45(l), or even no greater than about 0.40(l). It will be appreciated that the center of mass can be displaced a distance from the geometric midpoint along the longitudinal axis by a distance within a range between any of the minimum and maximum values noted above.

Figure 11:
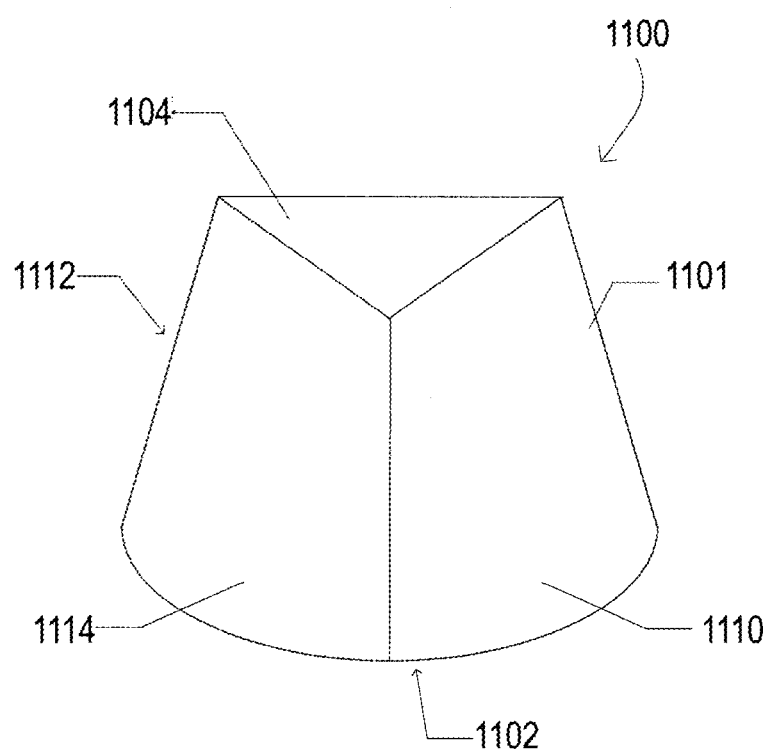

FIG. 11 includes an illustration of a shaped abrasive particle according to an embodiment. The shaped abrasive grain 1100 may include a body 1101 including a base surface 1102 and an upper surface 1104 separated from each other by one or more side surfaces 1110, 1112, and 1114. According to one particular embodiment, the body 1101 can be formed such that the base surface 1102 has a planar shape different than a planar shape of the upper surface 1104, wherein the planar shape is viewed in the plane defined by the respective surface. For example, as illustrated in the embodiment of FIG. 11, the body 1101 can have base surface 1102 generally have a circular shape and an upper surface 1104 having a generally triangular shape. It will be appreciated that other variations are feasible, including any combination of shapes at the base surface 1102 and upper surface 1104.

EXAMPLE 1

A first sample of particulate material (S1) is made according to the following procedures. First, lanthanum nitrate hexahydrate, phosphoric acid, and deionized water are obtained. A calcined, raw material powder of alumina is obtained and the pore volume is measured using BET and the amount of water that is absorbed by a 10 g sample of the raw material powder to determine saturation and oversaturation conditions for the raw material powder. The raw material is commercially available as Catapal B from Sasol Corp.

The additive is formed, which includes a first component of a phosphoric acid and a second component of lanthanum nitrate salt solution. Each of the components is formed based on an intended amount of second phase that is desired in the finally-formed particulate material. The components are in the form of solutions.

The raw material powder is impregnated with the phosphoric acid component by dispersing the solution on the raw material powder and stirring the mixture. The mixture is dried for at least 8 hours at 95° C. in air.

After drying the raw material impregnated with the phosphoric acid component, the available pore volume for the lanthanum nitrate salt component is calculated based on the first component addition. A molar ratio of approximately 1:1 of La to P is used to calculate the concentration of the lanthanum nitrate salt to be added to the dried raw material. The lanthanum nitrate salt component is then dispersed onto the dried material while stirring for impregnation into the alumina-based raw material. The mixture is dried for at least 8 hours at 95° C. in air.

The mixture including the first and second components is sintered in a rotary kiln at a temperature of approximately 1450° C. for a time of 10 minutes in air. The sintered particulate material had a density of 97.5% theoretical density, a specific surface area of 0.1 m$^2$/g, approximately 97% of a first phase of alpha alumina, approximately 1.0 wt % of a second phase of monazite (LaPO$_4$), approximately 1.3 wt % of a third phase of a lanthanum aluminate compound (i.e., MgLaAl$_{11}$O$_{19}$), and a remainder of impurity materials.

Figure 12A:
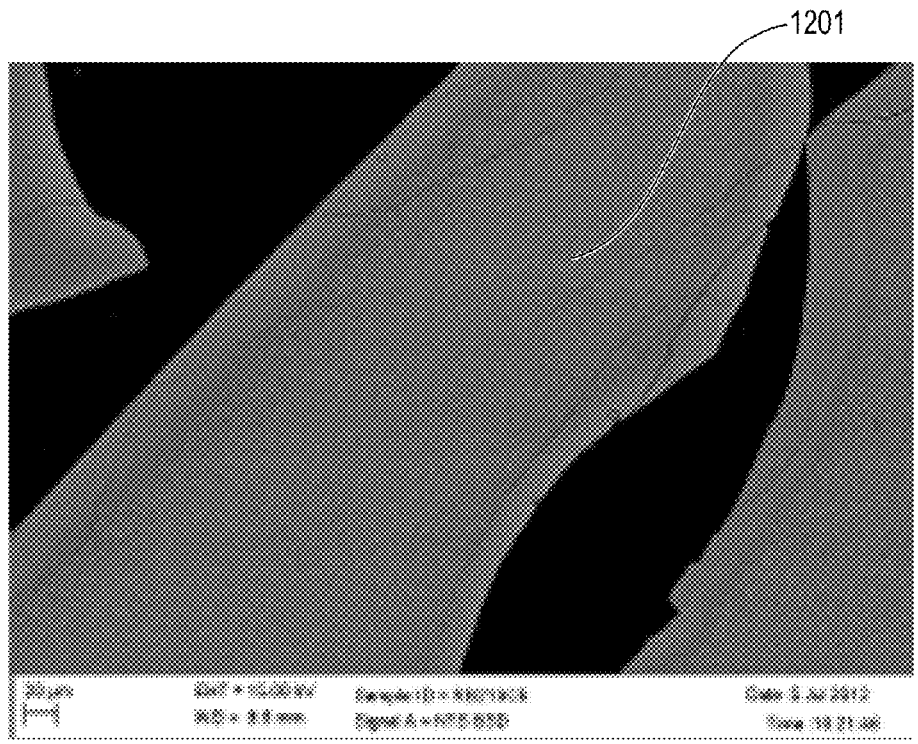
FIGS. 12A-12B include SEM pictures of a particulate material according to an embodiment.
Figure 12B:
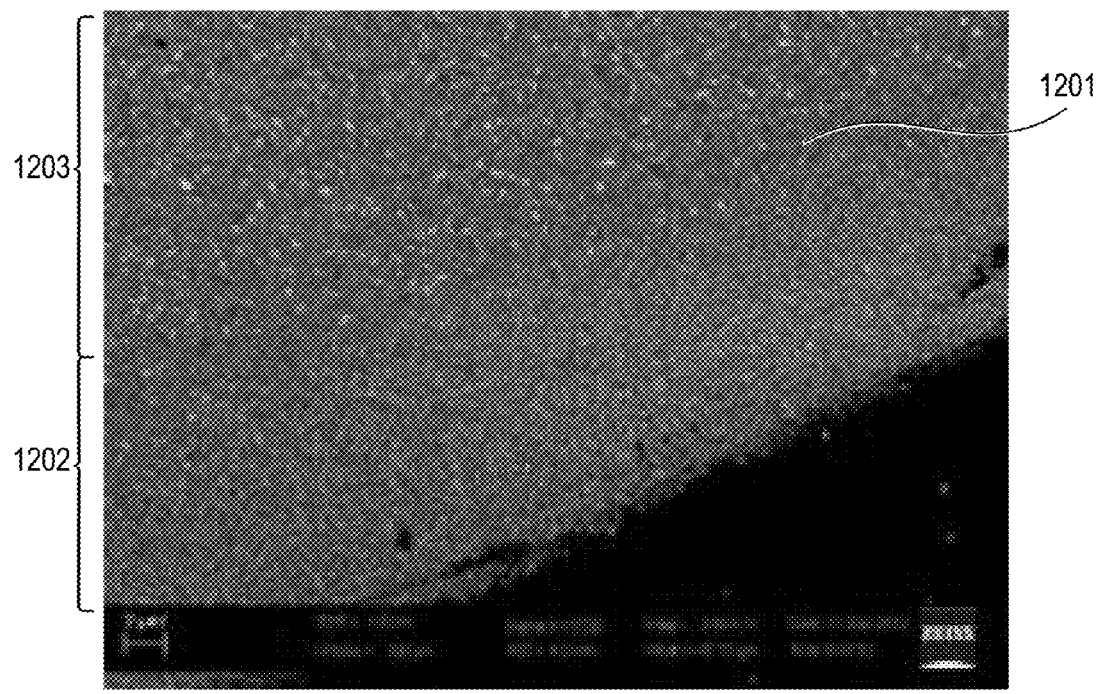

Particles according to Example 1 were made and analyzed. FIGS. 12A and 12B provide SEM images of a particulate material formed according to Example 1. As illustrated, the exemplary body 1201 includes a non-uniform distribution of the second phase at a peripheral region 1201 of the body. The particulate material demonstrates a non-uniform distribution of the second phase and the third phase, and in particular, the second phase is preferentially distributed in a peripheral region 1202, distinct from the central region 1203. Moreover, the third phase is preferentially distributed in the peripheral region 1202.

Figure 13:
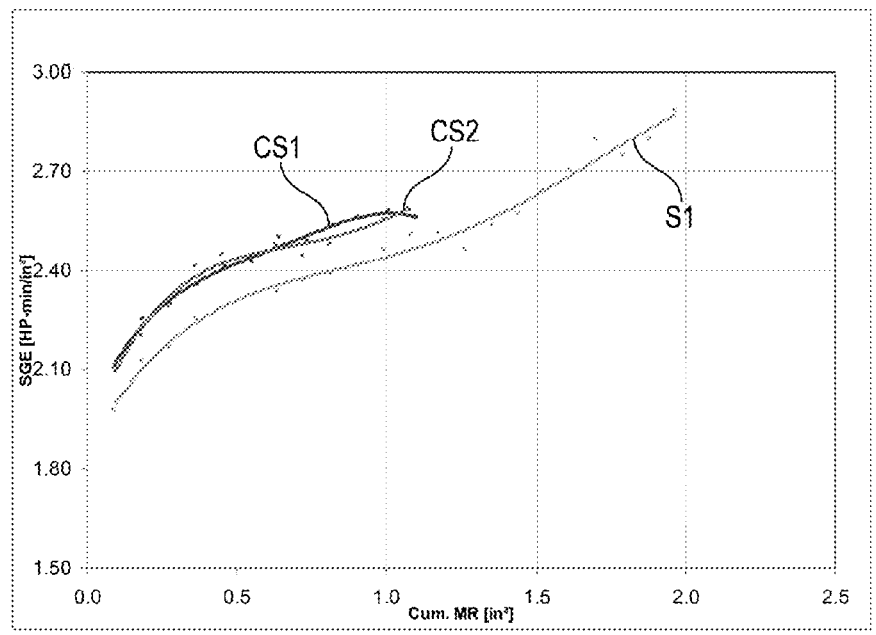
FIG. 13 includes a plot of specific grinding energy versus cumulative material removed for a comparative grinding test between conventional particles and particulate material representative of an embodiment.

The abrasive particles of FIGS. 12A and 12B demonstrate remarkable and unexpected improvement in grinding capabilities compared to conventional grains. FIG. 13 includes a plot of specific grinding energy versus cumulative material removed for a grinding test on a workpiece of 304 stainless steel operated as a dry plunge grinding operation at a material removal rate of 4 inch$^3$/min inch, grinding in short intervals removing 0.2 inch$^3$/interval, at a wheel speed of 7500 sfpm. As illustrated, the particulate material of sample S1 demonstrated increased cumulative material removed at a consistently lower specific grinding energy compared to state-of-the-art abrasive materials. In particular, the comparative examples using the same belt architecture (e.g., backing material, make coat material, size coat material, etc.) included conventional sample 1 (CS1), commercially available as HiPAL 133-1 from Saint-Gobain Abrasives, Inc. and conventional sample 2 (CS2), commercially available from 3M as 321 abrasive grain.

EXAMPLE 2

A second sample (S2) of particulate material is made according to Example 1, but the component of lanthanum nitrate salt is added first, and thereafter, the component of phosphoric acid is added. The particulate material of sample S2 had a density of 97.5% theoretical density, a specific surface area of 0.1 m$^2$/g, approximately 98% of a first phase of alpha alumina, approximately 1.1 wt % of a second phase of monazite (LaPO$_4$), approximately 0.7 wt % of a third phase of a lanthanum aluminate compound (i.e., MgLaAl$_{11}$O$_{19}$), and a minor content of impurities.

Figure 14:
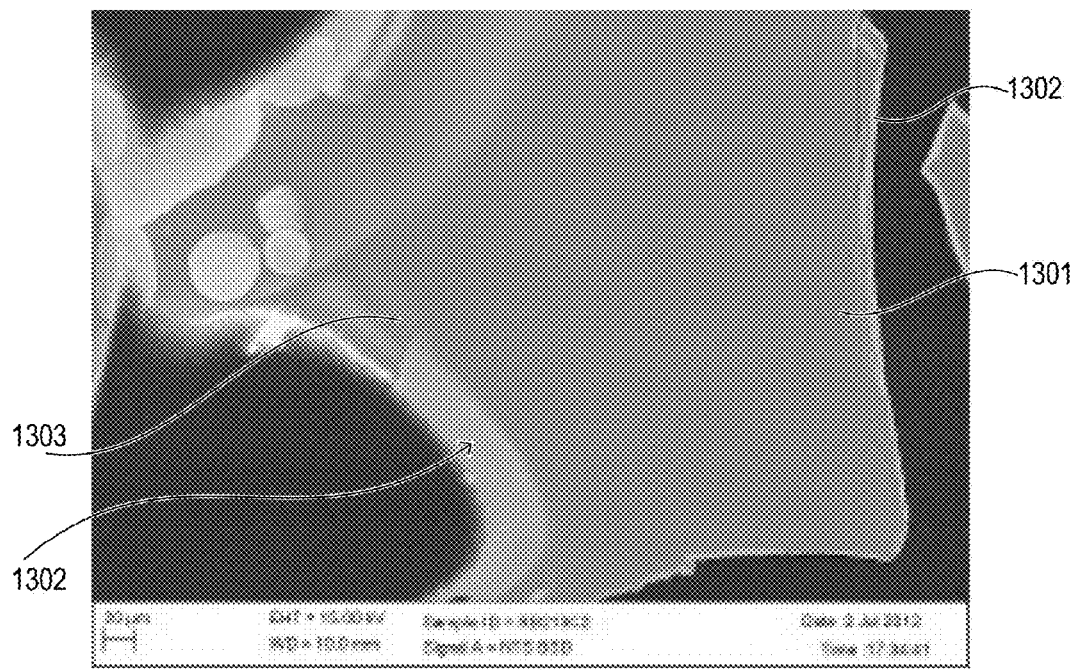
FIG. 14 includes a SEM picture of a particulate material according to an embodiment.

Particles according to Example 2 were made and analyzed. FIG. 14 includes a SEM image of particulate material formed according to Example 2. As illustrated, the exemplary body 1401 includes a non-uniform distribution of the second phase at a peripheral region 1402 of the body 1401. After analysis, it was determined the particulate material has a non-uniform distribution of the second phase and the third phase, and in particular, the second phase is preferentially distributed in a peripheral region 1402 and the third phase is preferentially distributed in a central region 1403.

EXAMPLE 3

A third sample (S3) of particulate material is made according to an embodiment, and in particular utilizes a doping procedure. The doping procedure includes forming an additive in the form of a mixture including La nitrate hexahydrate in water with phosphoric acid. A chemical reaction occurred, forming hydrated monazite (rhabdophane) as a precipitate. The mixture containing the hydrated monazite is then mixed with a precursor raw material powder of Example 1. The precursor raw material powder of Example 1 is formed from boehmite commercially available as Catapal B from Sasol Corp. that is incorporated into a mixture including 30% solids (boehmite), 1 wt % seed material (alpha alumina) for the total weight of the boehmite, and 7 wt % nitric acid for the total weight of the boehmite. The mixture is in the form of a slurry using water as the liquid carrier that gels under ambient conditions. The additive can be added to the slurry or gel to dope the precursor raw material. Thereafter, the precursor raw material with the additive can be dried at 95° C., crushed and calcined at 1000° C. Thereafter, the material can further be sintered according to the conditions of Example 1.

The particulate material of sample S3 has a density of approximately 97.5% theoretical density, a specific surface area of about 0.1 m$^2$/g, approximately 96.5% of a first phase of alpha alumina, approximately 1.4 wt % of a second phase of monazite (LaPO$_4$), and approximately 2.1 wt % of a third phase of a lanthanum aluminate compound (i.e., MgLaAl$_{11}$O$_{19}$), and a minor content of impurities.

Figure 15:
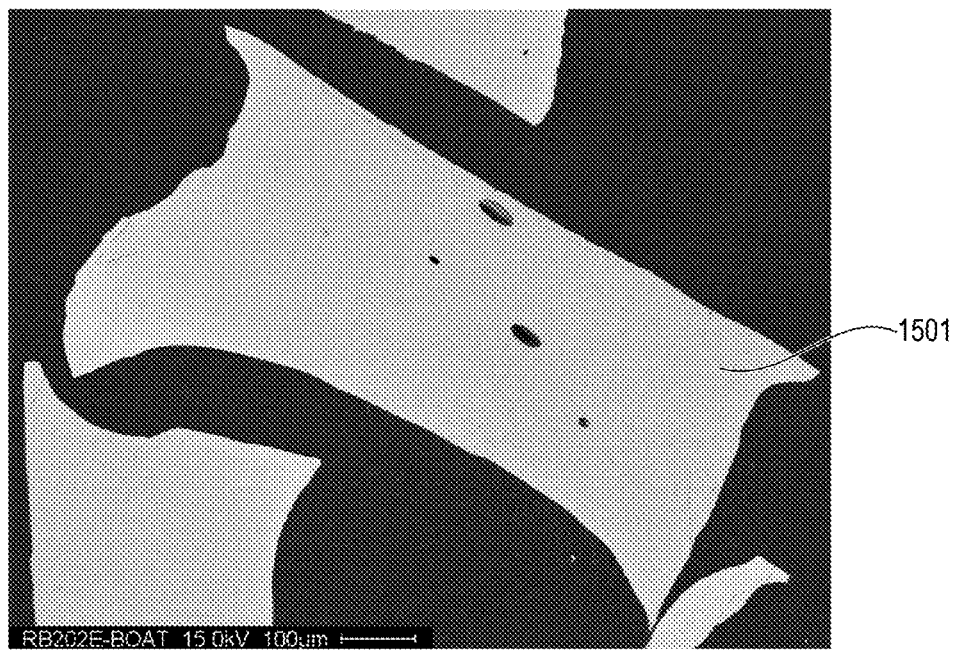
FIG. 15 includes a SEM picture of a particulate material according to an embodiment.

Particles according to Example 3 were made and analyzed. FIG. 15 includes a SEM picture of an exemplary particulate material formed according to Example 3. As illustrated, the body 1501 includes a substantially, uniform distribution of the second phase throughout the body 1501, and generally no evidence of a "halo" region is distinguishable.

EXAMPLE 4

Figure 16:
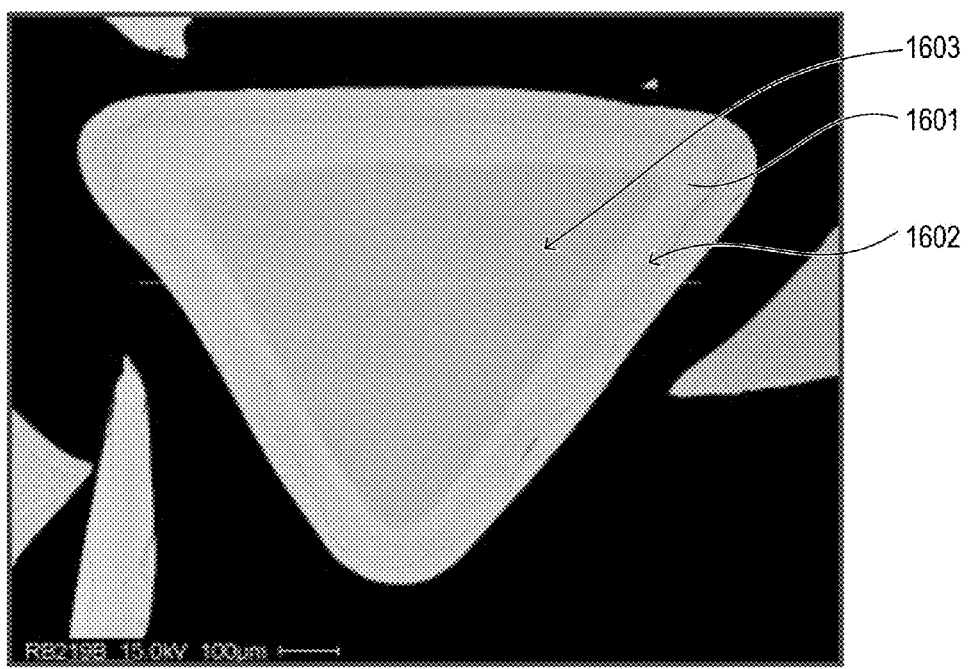
FIG. 16 includes a SEM picture of a particulate material according to an embodiment.

A fourth sample (S4) of particulate material is made according to an embodiment, and in particular, utilizes the same procedure used to form the particulate material S1, however the process is directed to impregnation of shaped abrasive particles. Accordingly, the raw material powder is in the form of green (i.e., unsintered) shaped abrasive particles, which have been dried after being formed. The first component is added to the green shaped abrasive particles, and the particles are calcined, and the second component is added to the calcined particles. The calcined particles having both components of the additive impregnated in the body are sintered. FIG. 16 includes an illustration of an exemplary particulate material formed according to Example 4. As illustrated, the body 1601 includes a non-uniform distribution of the second phase at a peripheral region 1602 of the body, generally defining a "halo" region within the body 1601 that is generally distinct from a central region 1603 within the interior of the body 1601.

The particulate material of sample S4 has a density of approximately 97.5% theoretical density, approximately 97.6% of a first phase of alpha alumina, approximately 0.9 wt % of a second phase of monazite (LaPO$_4$), and approximately 1.5 wt % of a third phase of a lanthanum aluminate compound (i.e., MgLaAl$_{11}$O$_{19}$), and a minor content of impurities.

EXAMPLE 5

Figure 17:
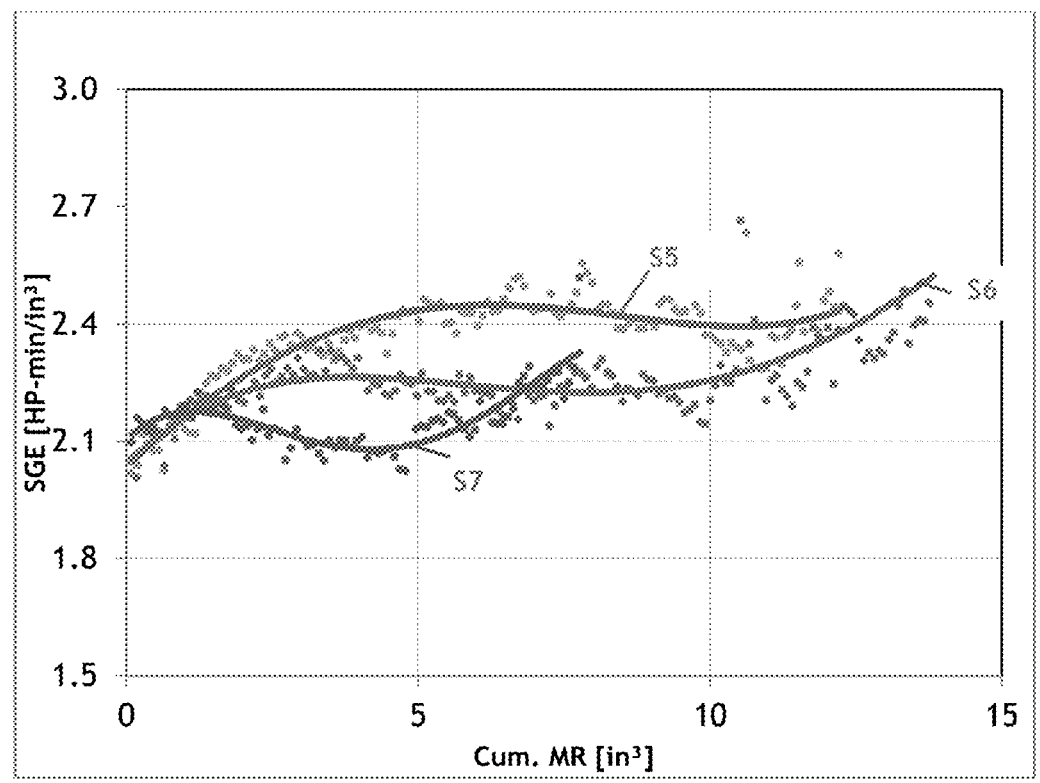
FIG. 17 includes a plot of specific grinding energy versus cumulative material removed for a grinding test on samples representative of embodiments herein.

A fifth sample (S5), a sixth sample (S6), and a seventh sample (S7) were formed according to Example 4, thus forming triangular shaped abrasive particles with different contents of monazite. The fifth sample S5 includes 3.8 wt % monazite and approximately 2.5 wt % lanthanum aluminate, sample S6 has 8.3 wt % monazite and approximately 2.5 wt % lanthanum alumina, and sample S7 has 12.9 wt % monazite and approximately 1.5 wt % lanthanum alumina. Each of the samples had an average crystalline size of alpha alumina of less than about 1 micron. The samples were tested according to the grinding test detailed in Example 1. FIG. 17 includes a plot of specific grinding energy versus cumulative material removed for a grinding test using samples S5, S6, and S7. The grinding test was performed on a workpiece of 304 stainless steel operated as a dry plunge grinding operation at a material removal rate of 4 inch$^3$/min inch, grinding in short intervals removing 0.2 inch$^3$/interval, at a wheel speed of 7500 sfpm. As illustrated, samples S5, S6, and S7 demonstrated different grinding performance as compared to each other.

The present application represents a departure from the state of the art. While the industry has recognized that alumina materials may have certain additives, such as zirconia, magnesia, lanthanum, and calcia, and raw material mineral additives including a combination of such elements, such as monazite, the industry has not recognized the significance of the combination of features disclosed herein. Notably, the particulate material of the embodiments herein can be formed through unique processes that can result in a combination of unique features, including but not limited to composition, additives, morphology, two-dimensional shape, three-dimensional shape, distribution of phases, difference in height, difference in height profile, flashing percentage, height, dishing, half-life change of specific grinding energy, and a combination thereof. And in fact, particulate material of embodiments herein has proven to result in remarkable and unexpected performance.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A particulate material having a body including a first phase comprising alumina and a second phase comprising an oxide compound, wherein the oxide compound comprises phosphorus and a rare earth element, wherein the body comprises a greater content of the second phase within a peripheral region of the body as compared to a content of the second phase within a central region of the body wherein the body is a shaped abrasive particle.

2. A particulate material having a body including a first phase comprising alumina and a second phase comprising phosphorus and a rare earth element, wherein the body comprises a greater content of the second phase within a peripheral region of the body as compared to a content of the second phase within a central region of the body, and wherein the body further comprises a third phase, and wherein the third phase comprises lanthanum aluminate.

3. The particulate material according to claim 2, wherein the body includes at least 0.5 to 30 wt % of the third phase for the total weight of the body.

4. The particulate material according to claim 2, wherein the second phase comprises monazite.

5. The particulate material according to claim 2, wherein the body comprises a ratio [W3/W2], wherein W3 represents a weight percent of the third phase within the body and W2 represents a weight percent of the second phase within the body, and wherein the ratio [W3/W2] is at least about 1.5.

6. The particulate material according to claim 2, wherein the body comprises a ratio [G1/G3], wherein G1 represents an average grain size of the first phase and G3 represents an average grain size of the third phase, and wherein the ratio [G1/G3] is in a range between about 0.2 and 5.

7. The particulate material according to claim 2, wherein the third phase is disposed within grains of the first or second phases.

8. The particulate material according to claim 1, wherein the body includes at least 0.5 to 30 wt % of the second phase for the total weight of the body.

9. The particulate material according to claim 1, wherein the second phase comprises $LaPO_4$.

10. The particulate material according to claim 1, wherein the particulate material is part of a fixed abrasive article selected from the group consisting of a coated abrasive article and a bonded abrasive article.

11. The particulate material according to claim 1, wherein the body comprises a two-dimensional shape selected from the group consisting of triangular, quadrilateral, rectangular, trapezoidal, pentagonal, heptagonal, hexagonal, and octagonal.

12. The particulate material according to claim 2, wherein the body is a shaped abrasive particle.

13. The particulate material according to claim 1, wherein the first phase has an average grain size of not greater than about 500 μm and the second phase has an average grain size of not greater than about 1 micron.

14. The particulate material according to claim 2, wherein the body comprises a greater content of the third phase within a peripheral region of the body as compared to a content of the third phase within a central region of the body.

15. The particulate material according to claim 2, wherein the content of the third phase is uniformly dispersed in the body.

16. The particulate material according to claim 1, wherein the content of the second phase in the peripheral region is greater than half of the total amount of second phase in the body based on the weight of the second phase.

17. The particulate material according to claim 1, wherein the first phase includes at least 70 to 99.5 wt % alumina for the total weight of the first phase.

18. A particulate material having a body including a first phase comprising alumina and a second phase comprising phosphorus and a rare earth element, wherein the body comprises a greater content of the second phase within a peripheral region of the body as compared to a content of the second phase within a central region of the body, and wherein the body is a shaped abrasive particle.

19. The particulate material according to claim 18, wherein the second phase comprises $LaPO_4$.

20. The particulate material according to claim 18, wherein the particulate material is part of a fixed abrasive article selected from the group consisting of a coated abrasive article and a bonded abrasive article.

* * * * *